US012604076B2

(12) United States Patent
Murakita

(10) Patent No.: US 12,604,076 B2
(45) Date of Patent: Apr. 14, 2026

(54) ENDOSCOPE SYSTEM, CONTROL METHOD, AND PROGRAM

(71) Applicant: Sony Group Corporation, Tokyo (JP)

(72) Inventor: Masashi Murakita, Chiba (JP)

(73) Assignee: Sony Group Corporation, Tokyo (JP)

( * ) Notice: Subject to any disclaimer, the term of this patent is extended or adjusted under 35 U.S.C. 154(b) by 0 days.

(21) Appl. No.: 18/726,517

(22) PCT Filed: Jan. 12, 2023

(86) PCT No.: PCT/JP2023/000542
§ 371 (c)(1),
(2) Date: Jul. 3, 2024

(87) PCT Pub. No.: WO2023/145448
PCT Pub. Date: Aug. 3, 2023

(65) Prior Publication Data
US 2025/0097559 A1      Mar. 20, 2025

(30) Foreign Application Priority Data

Jan. 27, 2022    (JP) ................................. 2022-010941

(51) Int. Cl.
*H04N 23/50* (2023.01)
*H04N 23/667* (2023.01)
(Continued)

(52) U.S. Cl.
CPC ......... *H04N 23/555* (2023.01); *H04N 23/667* (2023.01); *H04N 23/675* (2023.01); *H04N 23/73* (2023.01)

(58) Field of Classification Search
CPC .... H04N 23/555; H04N 23/667; H04N 23/73; H04N 23/675
See application file for complete search history.

(56) References Cited

U.S. PATENT DOCUMENTS

2018/0007256 A1* 1/2018 Yoshino .................... A61B 1/06
2019/0053693 A1* 2/2019 Koiso ................ A61B 1/00059
(Continued)

FOREIGN PATENT DOCUMENTS

JP        3693215 B2    9/2005
JP    2010-035131 A    2/2010
(Continued)

OTHER PUBLICATIONS

International Search Report and Written Opinion mailed on Mar. 20, 2023, received for PCT Application No. PCT/JP2023/000542, filed on Jan. 12, 2023, 08 pages including English Translation.

*Primary Examiner* — Rowina J Cattungal
(74) *Attorney, Agent, or Firm* — XSENSUS LLP

(57) ABSTRACT

An endoscope system includes an imaging device to which an insertion unit is connected, the imaging device receiving light guided through the insertion unit by an image sensor to capture an image; and a control device that controls the imaging device, in which the control device includes one or more processors and one or more storage devices storing a program, and the processor executes the program to: determine a size of an observation area different from a vignetting area generated on the image sensor by the insertion unit at least twice or more; and perform parameter change processing based on a determination result on the basis of a comparison result of comparison of two or more determination results. The present technology can be applied to, for example, an endoscope system using a surgical endoscope.

20 Claims, 16 Drawing Sheets

(51) Int. Cl.
  _H04N 23/67_ (2023.01)
  _H04N 23/73_ (2023.01)

(56) References Cited

U.S. PATENT DOCUMENTS

2021/0019884 A1 * 1/2021 Kawai ..................... A61B 1/05
2021/0275000 A1 9/2021 Ramesh
2021/0281731 A1 * 9/2021 Michihata ............. H04N 23/74

FOREIGN PATENT DOCUMENTS

| JP | 2015-205127 A | 11/2015 | |
| JP | 2019-162280 A | 9/2019 | |
| JP | 2020-162803 A | 10/2020 | |
| WO | WO-2007070641 A2 | 6/2007 | |
| WO | 2017/072950 A1 | 5/2017 | |
| WO | WO-2020184228 A1 * | 9/2020 | .............. A61B 1/00 |
| WO | WO-2020203810 A1 | 10/2020 | |
| WO | WO-2021075306 A1 * | 4/2021 | .......... A61B 90/361 |

* cited by examiner

*FIG. 16*

| RECOGNITION RESULT | | STOP RECOGNITION SUCCESS |
|---|---|---|
| MASK DIAMETER INFORMATION | MASK TYPE | TYPE0 : NO<br>TYPE4 : MINIMUM<br>TYPE3 : SMALL<br>TYPE2 : MEDIUM<br>TYPE1 : LARGE |

ENDOSCOPE SYSTEM, CONTROL METHOD, AND PROGRAM

CROSS-REFERENCE TO RELATED APPLICATIONS

The present application is based on PCT filing PCT/JP2023/000542, filed Jan. 12, 2023, which claims priority from Japanese Patent Application No. 2022-010941, filed Jan. 27, 2022, the entire contents of each are incorporated herein by reference.

TECHNICAL FIELD

The present disclosure relates to an endoscope system, a control method, and a program, and more particularly, to an endoscope system, a control method, and a program capable of suppressing erroneous determination when determining an observation area.

BACKGROUND ART

In general, a surgical endoscope uses a camera head to which a scope is connected, and observes an operative field by inserting the scope into a patient.

The scope is detachable, and a scope to be used is selected by a surgical staff from among a plurality of types of scopes. At this time, since mechanical vignetting and properties are different depending on the type of the scope, it is necessary to adjust image processing in a subsequent stage depending on the type of the scope. Therefore, a method for discriminating the type of the scope is required.

As this type of discrimination method, for example, a technique disclosed in Patent Document 1 has been known. In Patent Document 1, a plurality of evaluation frames arranged at predetermined intervals is set for an endoscopic image captured using a scope, evaluation values regarding the respective plurality of set evaluation frames are calculated, and the type of the scope is estimated on the basis of a relationship between the calculated evaluation values.

CITATION LIST

Patent Document

Patent Document 1: Japanese Patent Application Laid-Open No. 2020-162803

SUMMARY OF THE INVENTION

Problems to be Solved by the Invention

In a medical site using a surgical endoscope, when a high-brightness subject such as forceps or gauze is present in an imaging area or when a scope is inserted into a patient's body, a vignetting area temporarily becomes bright due to a large amount of reflected light, and erroneous determination may occur in determining an observation area corresponding to a type of the scope.

The present disclosure has been made in view of such a situation, and an object thereof is to suppress erroneous determination when determining an observation area.

Solutions to Problems

An endoscope system according to one aspect of the present disclosure is an endoscope system including: an imaging device to which an insertion unit is connected, the imaging device receiving light guided through the insertion unit by an image sensor to capture an image; and a control device that controls the imaging device, in which control device includes one or more processors and one or more storage devices storing a program, and the processor executes the program to: determine a size of an observation area different from a vignetting area generated on the image sensor by the insertion unit at least twice or more; and perform parameter change processing based on a determination result on the basis of a comparison result of comparison of two or more determination results.

A control method according to one aspect of the present disclosure is a control method including: by a control device that controls an imaging device to which an insertion unit is connected and which receives light guided through the insertion unit by an image sensor and captures an image, determining a size of an observation area different from a vignetting area generated on the image sensor by the insertion unit at least twice or more; and performing parameter change processing based on determination result on the basis of comparison result of comparison of two or more determination results.

A program according to one aspect of the present disclosure is a program for causing a computer to function as a control device, the control device determining, at least twice or more, a size of an observation area different from a vignetting area generated on an image sensor by an insertion unit connected to an imaging device that receives light guided through the insertion unit by an image sensor and captures an image, and performing parameter change processing based on determination result on the basis of comparison result of comparison of two or more determination results.

In the endoscope system, the control system, and the program according to one aspect of the present disclosure, a size of an observation area different from a vignetting area is determined at least twice or more, the vignetting area being generated on an image sensor by an insertion unit connected to an imaging device that receives light guided through the insertion unit by an image sensor and captures an image; and parameter change processing based on determination result is performed on the basis of comparison result of comparison of two or more determination results.

Note that the imaging device and the control device included in the endoscope system according to one aspect of the present disclosure may be independent devices or may be internal blocks configuring one device.

BRIEF DESCRIPTION OF DRAWINGS

FIG. 16 is a diagram illustrating an example of a recognition result and mask diameter information notified an external module of.

MODE FOR CARRYING OUT THE INVENTION

<System Configuration>

Figure 1:
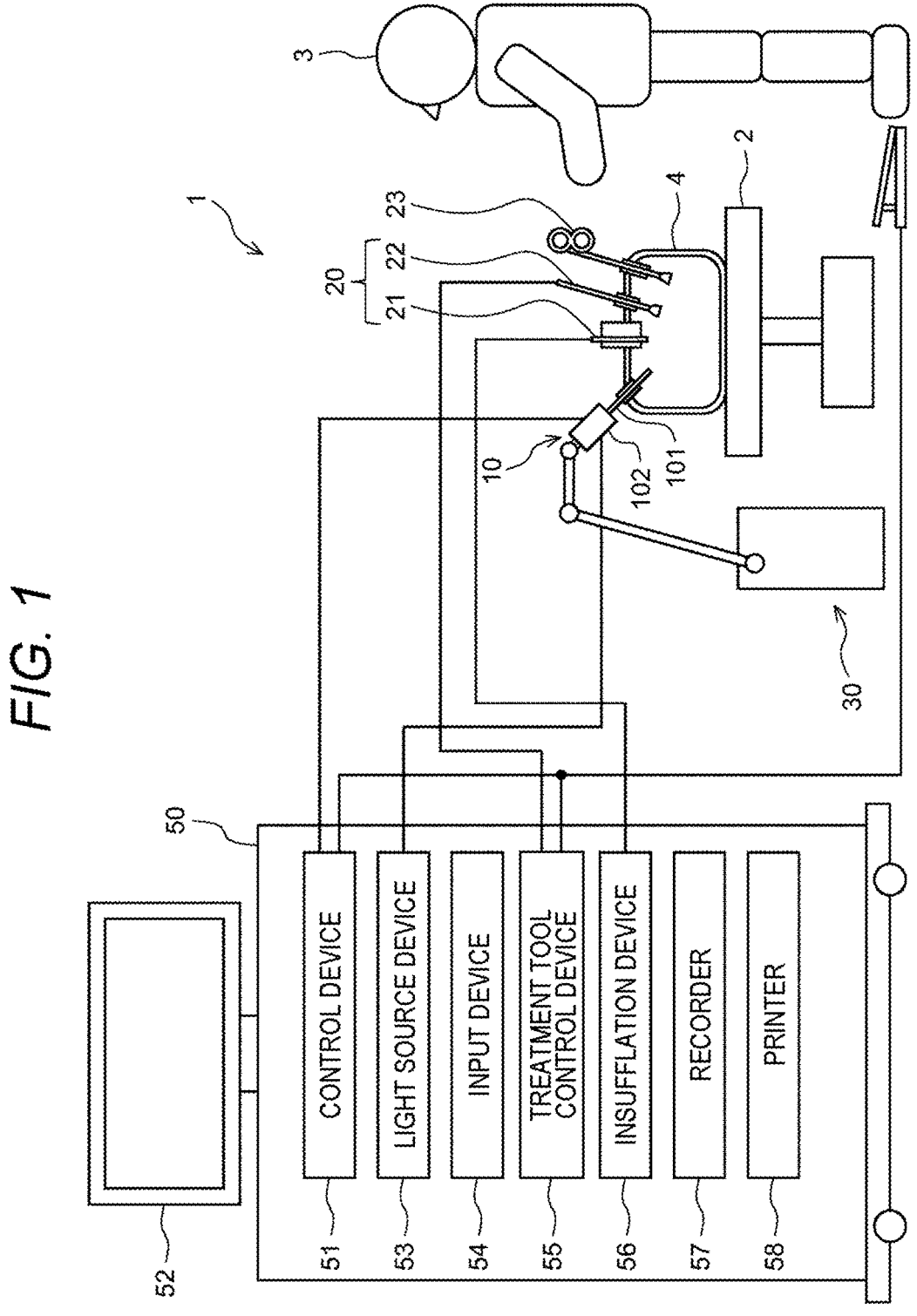
FIG. 1 is a diagram illustrating a schematic configuration example of an endoscope system according to a technology of the present disclosure.

An outline of a system according to the technology according to the present disclosure will be described. FIG. 1 is a diagram illustrating a schematic configuration example of an endoscope system according to the technology of the present disclosure.

FIG. 1 illustrates a state in which an operator (doctor) 3 is performing surgery on a patient 4 on a patient bed 2 using an endoscopic surgery system 1. In FIG. 1, an endoscopic surgery system 1 includes an endoscope 10, other surgical tools 20 such as an insufflation tube 21, an energy treatment tool 22, and forceps 23, a support arm device 30 that supports the endoscope 10, and a cart 50 on which various devices for endoscopic surgery are mounted.

The endoscope 10 includes a scope 101 whose area of a predetermined length from a distal end is inserted into a body of the patient 4, and a camera head 102 connected to a proximal end of the scope 101. In the example of FIG. 1, the endoscope 10 configured as a rigid scope including the scope 101 as a rigid lens barrel is illustrated, but the endoscope 10 may be configured as a flexible scope including a flexible lens barrel.

An opening portion into which an objective lens is fitted is provided at the distal end of the scope 101. A light source device 53 is connected to the endoscope 10, and light (irradiation light) generated by the light source device 53 is guided to a distal end of the lens barrel by a light guide extending inside the scope 101, and is emitted toward an observation target in the body of the patient 4 through the objective lens. The endoscope 10 may be a forward-viewing endoscope, an oblique-viewing endoscope, or a side-viewing endoscope.

An optical system and an imaging element are provided inside the camera head 102, and light (observation light) reflected from the observation target is condensed on the imaging element by the optical system. The imaging element photoelectrically converts the observation light to generate an image signal corresponding to the subject image. This image signal is transmitted to a control device 51 as RAW data (RAW image).

The control device 51 is a camera control unit (CCU) including a processor such as a central processing unit (CPU), a field programmable gate array (FPGA), a storage device, and the like. The control device 51 integrally controls operation of each device including the endoscope 10 and a display device 52. Furthermore, the control device 51 receives an image signal from the camera head 102, and performs various types of image processing for displaying an observation image (display image) based on the image signal, such as development processing (demosaic processing), on the image signal.

The display device 52 displays a display image based on the image signal subjected to the image processing by the control device 51 under the control of the control device 51. The light source device 53 includes a light source such as a light emitting diode (LED), for example. The light source device 53 supplies irradiation light for imaging a surgical site or the like to the endoscope 10. The irradiation light includes, for example, normal light such as white light as light in a first wavelength band (first wavelength light) and special light such as infrared (IR) light as light in a second wavelength band (second wavelength light). The IR light may include near infrared (NIR) light.

The input device 54 is an input interface for the endoscopic surgery system 1. The user can input various types of information and instructions to the endoscopic surgery system 1 through the input device 54. For example, the user inputs an instruction or a like to change an imaging condition (type of irradiation light, magnification, focal distance or the like) by the endoscope 10.

A treatment tool control device 55 controls driving of the energy treatment tool 22 for cauterization and incision of tissue, sealing of a blood vessel, or the like. An insufflation device 56 feeds gas into the body through the insufflation tube 21 in order to inflate a body cavity of the patient 4 for the purpose of securing a visual field by the endoscope 10 and securing a working space of the operator. A recorder 57 is a device capable of recording various types of information regarding surgery. A printer 58 is a device capable of printing various types of information regarding surgery in various formats such as text, image, or graph.

Figure 2:
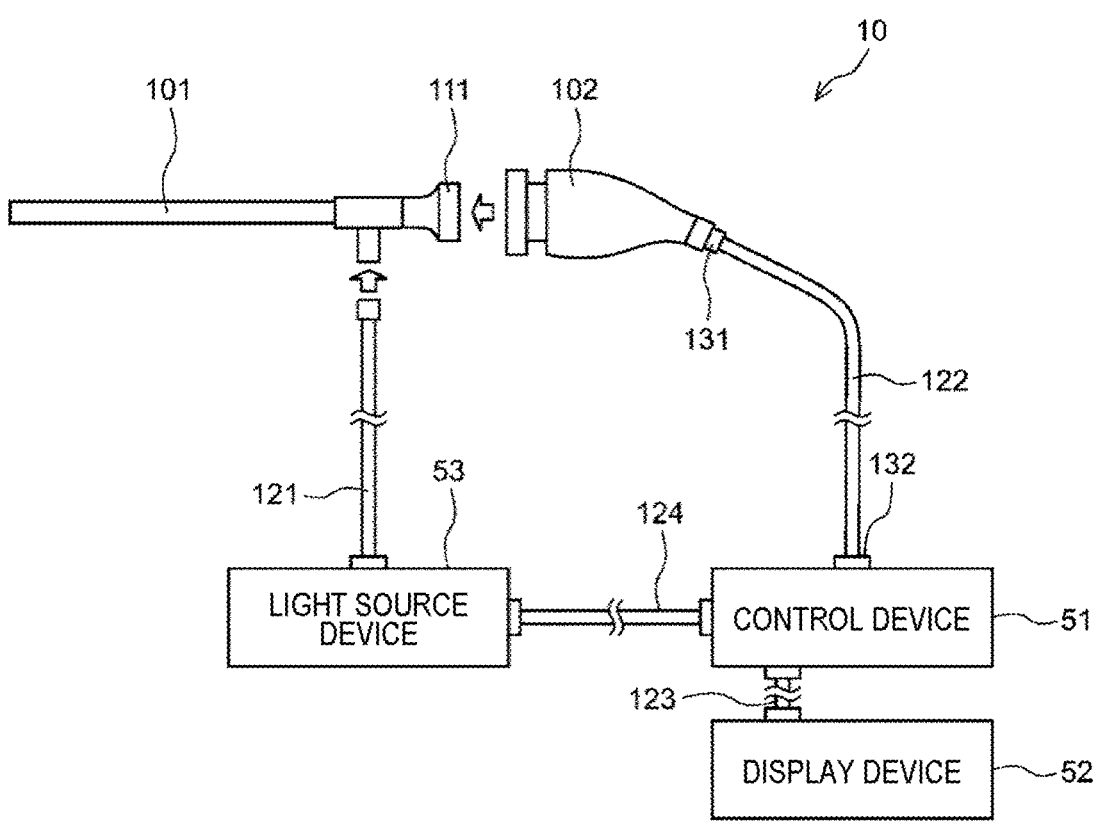
FIG. 2 is a diagram illustrating a detailed configuration example of an endoscope.

FIG. 2 illustrates a detailed configuration example of the endoscope 10 in FIG. 1.

In FIG. 2, the endoscope 10 includes a scope 101 and a camera head 102. In the endoscope 10, the scope 101 is connected to the light source device 53 through a light guide 121, and the camera head 102 is connected to the control device 51 through a transmission cable 122. The control device 51 is connected to the display device 52 through a transmission cable 123 and is connected to the light source device 53 through a transmission cable 124.

The scope 101 is configured as a rigid scope. That is, the scope 101 is an insertion portion (lens barrel) that is rigid or at least partially soft and has an elongated shape, and is inserted into the body of the patient 4. In the scope 101, an optical system that uses one or a plurality of lenses and condenses a subject image is provided.

The light source device 53 is connected to one end of the light guide 121, and supplies irradiation light for illuminating the inside of the body to one end of the light guide 121 under the control of the control device 51. The transmission cable 124 transmits a control signal from the control device 51 to the light source device 53. The light guide 121 transmits the irradiation light supplied from the light source device 53 from one end to the other end, and supplies the irradiation light to the scope 101. The irradiation light supplied to the scope 101 is emitted from the distal end of the scope 101 and emitted into the body. Observation light (subject image) emitted into the body and reflected in the body is condensed by the optical system in the scope 101.

The camera head 102 is detachably connected to a proximal end (eyepiece unit 111) of the scope 101. Under the control of the control device 51, the camera head 102 captures an image of the observation light (subject image) condensed by the scope 101 and outputs an image signal (RAW data) obtained as a result. The image signal is, for example, an image signal corresponding to 4K resolution (for example, 3840×2160 pixels). A detailed configuration of the camera head 102 will be described later with reference to FIG. 3.

The transmission cable 122 transmits an image signal and the like output from the camera head 102 to the control device 51. In addition, the transmission cable 122 transmits a control signal, a synchronization signal, power, and the like output from the control device 51 to the camera head 102. Note that, for transmission of an image signal or the like through the transmission cable 122, an image signal or the like may be transmitted as an electric signal or an optical signal. The similar applies to transmission of a control signal, a synchronization signal, and the like through the transmission cable 122. Furthermore, communication between the camera head 102 and the control device 51 is not limited to wired communication using the transmission cable 122, and wireless communication conforming to a predetermined communication method may be performed.

The transmission cable 123 transmits an image signal processed by the control device 51 and a control signal output from the control device 51 to the display device 52. The display device 52 displays a display image based on the image signal from the control device 51 under the control of the control device 51. The display device 52 can output sound (sound) on the basis of a control signal from the control device 51.

The control device 51 includes a processor, a storage device, and the like, and outputs a control signal and the like to each device including the light source device 53, the camera head 102, and the display device 52 to integrally control the operation of each device. Furthermore, the control device 51 processes the image signal and the like output from the camera head 102, and controls the operation of each device on the basis of the processing result. A detailed configuration of the control device 51 will be described later with reference to FIG. 3.

Figure 3:
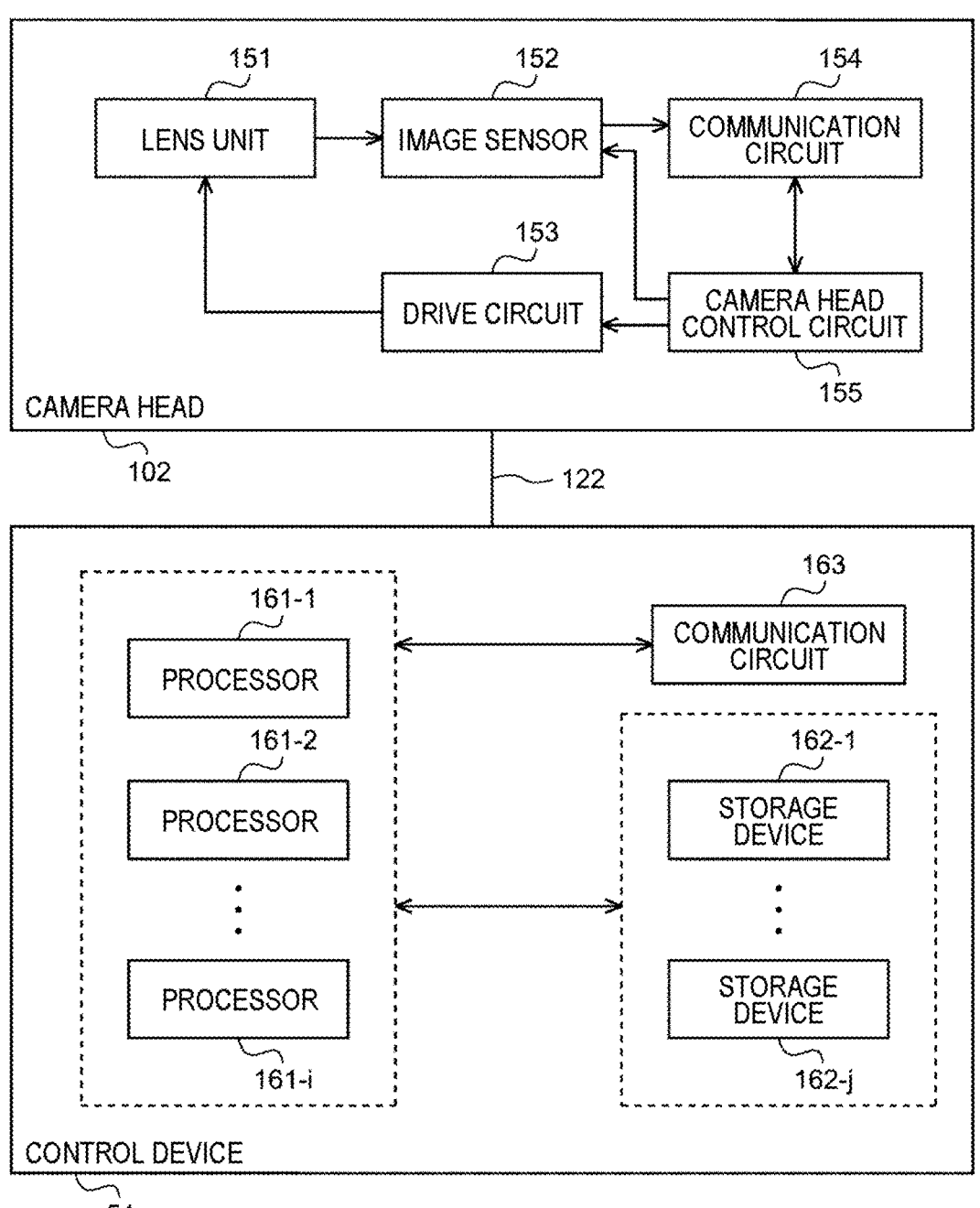
FIG. 3 is a block diagram illustrating a detailed configuration example of a camera head and a control device.

FIG. 3 is a block diagram illustrating a detailed configuration example of the camera head 102 and the control device 51 illustrated in FIGS. 1 and 2. The camera head 102 is an example of an imaging device according to the technology of the present disclosure, and receives light guided through the scope 101 by an image sensor and captures an image. The control device 51 is an example of a control device according to the technology of the present disclosure, and controls the camera head 102.

The camera head 102 includes a lens unit 151, an image sensor 152, a drive circuit 153, a communication circuit 154, and a camera head control circuit 155. The camera head 102 and the control device 51 are communicably connected to each other by a transmission cable 122.

The lens unit 151 is an optical system provided at a connection portion with the scope 101. Observation light taken in from a distal end of the scope 101 is guided to the camera head 102 and enters the lens unit 151. The lens unit 151 is configured by combining a plurality of lenses including a zoom lens and a focus lens.

The image sensor 152 includes, for example, an imaging element such as a complementary metal oxide semiconductor (CMOS) image sensor or a charge coupled device (CCD) image sensor, and a signal processing circuit (AD conversion circuit or the like). The image sensor 152 may include one imaging element (so-called single-plate type) or a plurality of imaging elements (so-called multi-plate type). The image sensor 152 is not necessarily provided in the camera head 102. For example, the image sensor 152 may be provided inside the scope 101 immediately behind the objective lens.

The drive circuit 153 includes an actuator and the like, and moves a zoom lens and a focus lens included in the lens unit 151 by a predetermined distance along an optical axis under the control of the camera head control circuit 155. As a result, a magnification and focus of the image captured by the image sensor 152 are appropriately adjusted.

The communication circuit 154 includes a communication device for transmitting and receiving various types of information to and from the control device 51. The communication circuit 154 transmits an image signal obtained from the image sensor 152 as RAW data to the control device 51 through the transmission cable 122. Furthermore, the communication circuit 154 receives a control signal for controlling driving of the camera head 102 from the control device 51, and supplies the control signal to the camera head control circuit 155. The control signal includes, for example, information regarding imaging conditions such as a frame rate of an image, an exposure value at the time of imaging, and information specifying magnification and focus of an image.

The imaging conditions such as the frame rate, the exposure value, the magnification, and the focus described above may be appropriately specified by a user's operation, or may be automatically set by (processor 161 thereof) the control device 51 on the basis of an acquired image signal. In the latter case, an auto exposure (AE) function, an auto focus (AF) function and an auto white balance (AWB) function are incorporated in the endoscope 10.

The camera head control circuit 155 controls driving of the camera head 102 on the basis of a control signal from the control device 51 received through the communication circuit 154.

The control device 51 includes processors 161-1 to 161-*i*, storage devices 162-1 to 162-*j*, and a communication circuit 163. Here, i and j are integers of 1 or more, and the control device 51 includes one or more processors 161 and one or more storage devices 162. In the following description, the processors 161-1 to 161-*i* will be referred to as a processor 161 in a case where it is not particularly necessary to distinguish them. Similarly, in a case where it is not necessary to particularly distinguish the storage devices 162-1 to 162-*j*, they are described as the storage device 162.

The processor 161 is a processor such as a CPU. The processor 161 can implement various functions by reading and executing a control program stored in the storage device 162. The processor 161 performs various types of control related to imaging of a surgical site or the like by the endoscope 10 and display of an endoscopic image (medical image) obtained by imaging of the surgical site or the like. For example, the processor 161 generates a control signal for controlling driving of the camera head 102.

Furthermore, the processor 161 performs various types of image processing on the image signal transmitted from the camera head 102. The processor 161 causes the display device 52 to display a display image (endoscopic image) of a surgical site or the like on the basis of the image signal subjected to the image processing. At this time, the processor 161 may recognize various objects in the image using various image recognition technologies.

For example, the processor 161 can recognize a surgical tool such as forceps, a specific living body site, bleeding, mist at the time of using the energy treatment tool 22, and the like by detecting the shape, color, and the like of an edge of the object included in the image. When causing the display device 52 to display the image, the processor 161 may superimpose and display various types of surgery support information on the image of the surgical site using the recognition result.

The storage device 162 is a storage device such as a semiconductor storage device or a hard disk drive (HDD). The storage device 162 stores programs such as a control program executed by the processor 161, information (data, parameters, and the like) necessary for processing by the processor 161, and the like.

The communication circuit 163 includes a communication device for transmitting and receiving various types of information to and from the camera head 102. The communication circuit 163 receives an image signal transmitted from the camera head 102 through the transmission cable 122. Furthermore, the communication circuit 163 transmits a control signal for controlling driving of the camera head 102 to the camera head 102. The image signal and the control signal can be transmitted by electrical communication, optical communication or the like.

<Control Program Configuration>

Figure 4:
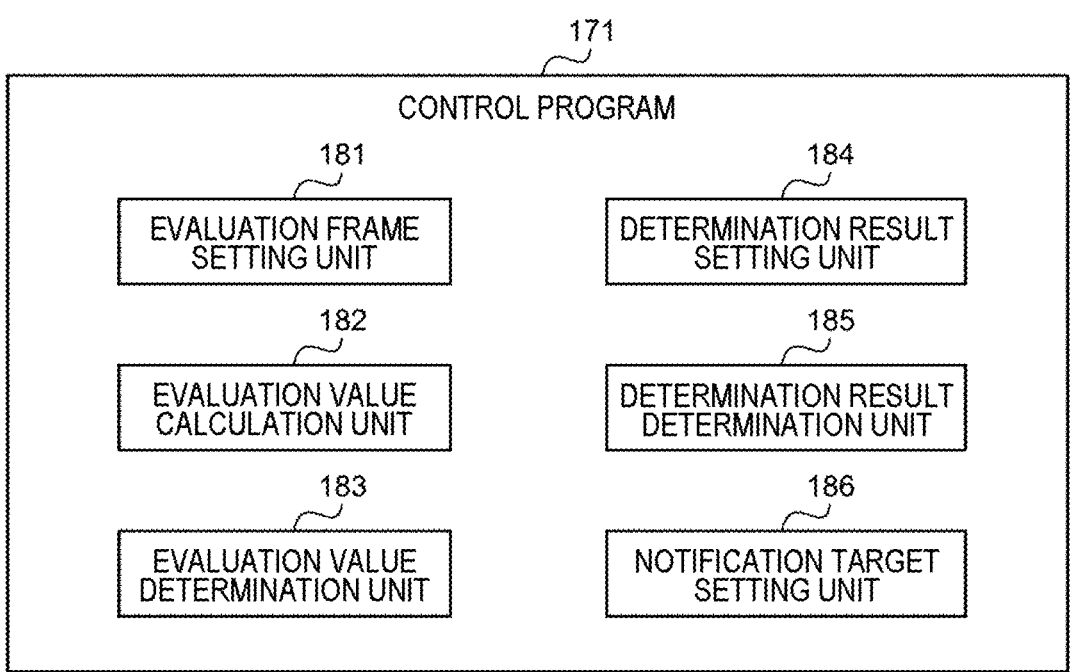
FIG. 4 is a diagram illustrating a configuration example of a control program.

FIG. 4 is a diagram illustrating a configuration example of a control program. The control program 171 is stored in the storage device 162 and read and executed by the processor 161.

The control program 171 includes an evaluation frame setting unit 181, an evaluation value calculation unit 182, an evaluation value determination unit 183, a determination result setting unit 184, a determination result determination unit 185, and a notification target setting unit 186.

The evaluation frame setting unit 181 sets a plurality of evaluation frames arranged at predetermined intervals for an endoscopic image (RAW image) corresponding to an image signal (RAW data). Here, the evaluation frame is an area arbitrarily set with respect to an area (area of a RAW image) corresponding to an imaging surface of an imaging element having a predetermined array pattern such as a Bayer array, and is a frame for acquiring an evaluation value such as information regarding brightness (luminance information).

The evaluation value calculation unit 182 calculates an evaluation value regarding each of the plurality of evaluation frames set by the evaluation frame setting unit 181. As the evaluation value, for example, luminance information (luminance value) in each evaluation frame is calculated.

The evaluation value determination unit 183 determines a relationship (correlation) between the evaluation values for each of the plurality of evaluation frames calculated by the evaluation value calculation unit 182. Here, for example, the relationship between the evaluation values corresponding to the evaluation frames adjacent to each other or arranged at regular intervals is determined. The determination result setting unit 184 performs setting regarding the determination result according to a relationship between the evaluation values determined by the evaluation value determination unit 183.

The determination result determination unit 185 determines whether or not the determination results set by the determination result setting unit 184 are the same a predetermined number of consecutive times. The notification target setting unit 186 sets a notification target to be notified the external module of on the basis of the determination result by the determination result determination unit 185.

Outline of the Invention According to Present Disclosure

By the way, in the endoscope 10, the scope 101 connected to the camera head 102 is inserted into the body of the patient 4, so that the operator 3 observes the operative field as described above.

Figure 5:
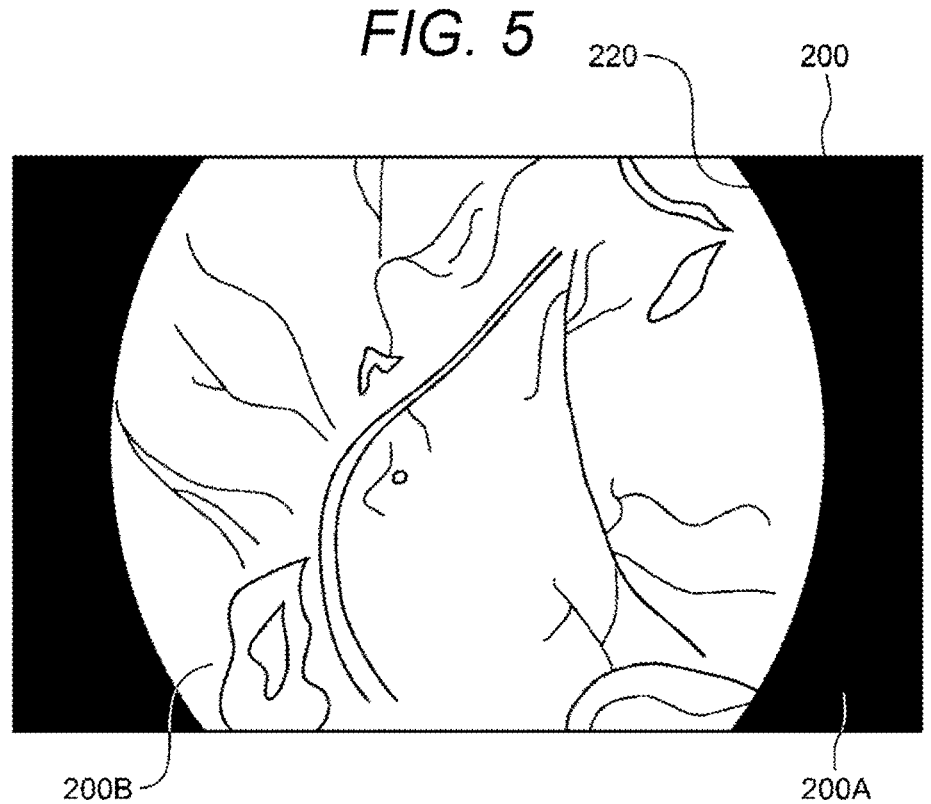
FIG. 5 is a diagram illustrating a first example of an endoscopic image.

For example, FIG. 5 illustrates an example of an endoscopic image 200 based on an image signal obtained by imaging, by the camera head 102, the subject image condensed by the scope 101. In the endoscopic image 200, left and right black areas represent a vignetting area 200A in which mechanical vignetting occurs, and an area of the subject image represents an observation area 200B. The vignetting area 200A can also be said to be a mask area (black area). The observation area 200B is an effective area different from the vignetting area 200A. A boundary between the vignetting area 200A and the observation area 200B is a mask edge 220.

That is, in the endoscope 10, the scope 101 having an elongated shape is attached, but since a shape of the subject image condensed by the scope 101 and a shape of the imaging surface of the image sensor 152 of the camera head 102 do not match, mechanical vignetting occurs due to the scope 101. That is, the mechanical vignetting is vignetting occurring on the image sensor 152 of the camera head 102.

The endoscopic image 200 is subjected to various types of image processing by the control device 51 to be displayed as a display image by the display device 52. For example, as illustrated in FIG. 6, the operator 3 can perform treatment such as resection of an affected part using the surgical tool 20 such as the energy treatment tool 22 while viewing the display image in real time.

Here, in the endoscope 10, the scope 101 is detachable, and the scope 101 to be used is selected by the surgical staff from among a plurality of types of scopes. At this time, since mechanical vignetting and properties differ depending on the type of the scope 101 to be used, it is necessary to adjust image processing in a subsequent stage depending on the type of the scope 101. Therefore, a method for determining the observation area 200B corresponding to the type of the scope 101 is required.

Figure 6:
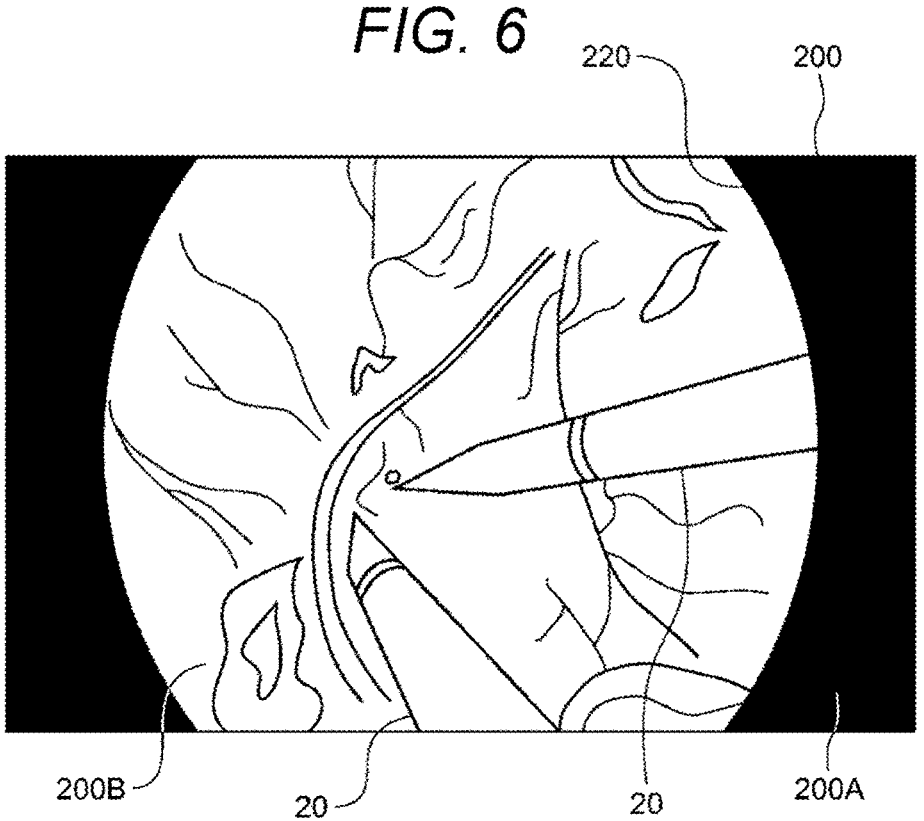
FIG. 6 is a diagram illustrating a second example of an endoscopic image.

Here, as illustrated in FIGS. 5 and 6, it is possible to determine the type of the scope 101 by determining (the size of) the observation area 200B, and it is also possible to determine (the size of) the vignetting area 200A. Therefore, it can be said that the type of the scope 101 is discriminated and the vignetting area 200A is determined by determining the observation area 200B. That is, discriminating the type of the scope 101, determining the observation area 200B, and determining the vignetting area 200A can be conceptually regarded as the same.

For example, signal processing related to AE, AF, and the like is performed on the observation area 200B, and various problems occur when exposure or focusing is performed including the vignetting area 200A, and then, it is necessary to determine (the size of) the observation area 200B. For example, in the technology disclosed in Patent Document 1 described above, a method of discriminating the type of the scope 101 to be used with a smaller amount of calculation in discriminating the type of the scope 101 to be used is proposed.

On the other hand, in a medical site using the endoscopic surgery system 1, when a high-luminance subject such as the forceps 23 or gauze is present in the imaging area or when the scope 101 is inserted into the body of the patient, the vignetting area 200A temporarily becomes bright due to a large amount of reflected light, and there is a possibility that erroneous determination occurs in determining (the size of) the observation area 200B corresponding to the type of the scope 101. Therefore, it has been required to prevent erroneous determination in discriminating the observation area 200B.

Therefore, the technology according to the present disclosure proposes a method of suppressing erroneous determination by continuously performing the determination processing of the observation area 200B corresponding to the type of the scope 101 and determining whether or not the determination result continues a predetermined number of consecutive times.

Hereinafter, details of the technology according to the present disclosure will be described. In the endoscopic surgery system 1 (the processor 161 of the control device 51 thereof), for example, the first processing to the third processing and the determination processing are executed as processing for determining the type of the scope 101 to be used, and thus, the processing will be sequentially described. Also, in the following description, an image corresponding to the imaging surface of the image sensor 152 of the camera head 102 will be referred to as an endoscopic image.

<Flow of First Processing>

First, a flow of first processing executed by the processor 161 of the control device 51 will be described with reference to a flowchart of FIG. 7.

In step S10, the evaluation frame setting unit 181 sets a plurality of evaluation frames for the image (RAW image) according to the image signal from the camera head 102. In the setting of the evaluation frames, for example, as illustrated in FIG. 8, evaluation frames 210 are provided at the central portion of the endoscopic image 200 and four corners of the peripheral portion thereof.

Specifically, in the endoscopic image 200, a rectangular evaluation frame 210-0 (hereinafter, the frame is also abbreviated as frame 0) is provided at the central portion, and rectangular evaluation frames 210-1, 210-2, 210-3, and 210-4 (hereinafter, frame 1, frame 2, frame 3, and frame 4 are also abbreviated) are provided at the four corners of the upper left, lower left, upper right, and lower right, respectively. The size of the rectangles of the evaluation frames 210-1 to 210-4 is smaller than the size of the rectangle of the evaluation frame 210-0.

Figure 8:
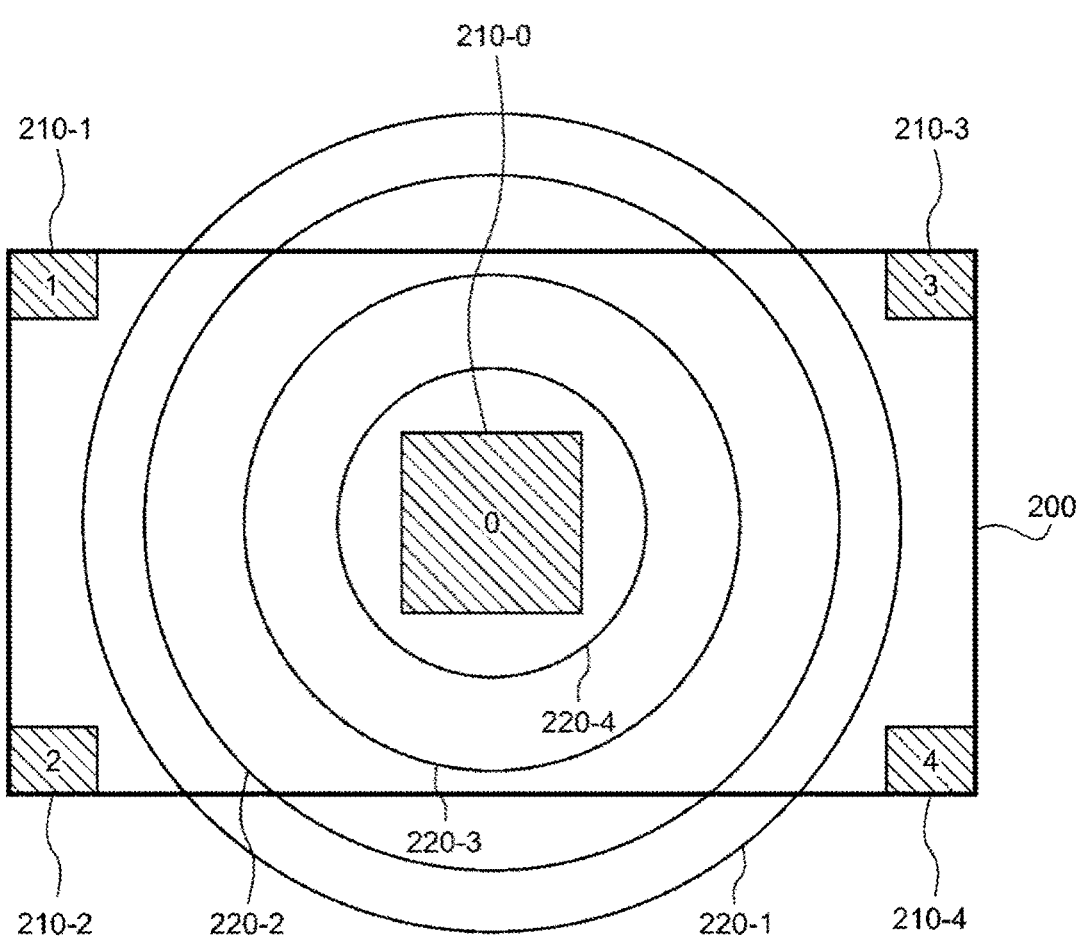
FIG. 8 is a diagram illustrating an example of a plurality of evaluation frames set in the first processing.

Furthermore, in FIG. 8, four circles having different diameters centered on the approximate center of gravity are superimposed on the endoscopic image 200, and these circles correspond to the mask edge 220 that is a boundary between the vignetting area 200A and the observation area 200B.

That is, since a diameter of the scope 101 used in the endoscope 10 corresponds to the mask edge 220 in the endoscopic image 200 and a position where the mask edge 220 is assumed to be detected in the endoscopic image 200 is known in advance in design, here, the evaluation frames 210-0 to 210-4 are provided in order to determine whether or not the vignetting area 200A is included.

Note that, in the following description, four types are assumed as the types of the scopes 101 to be used, and as the mask type of each mask edge 220, "TYPE1" is assigned to the mask edge 220-1, "TYPE2" is assigned to the mask edge

220-2, "TYPE3" is assigned to the mask edge 220-3, and "TYPE4" is assigned to the mask edge 220-4.

Figure 7:
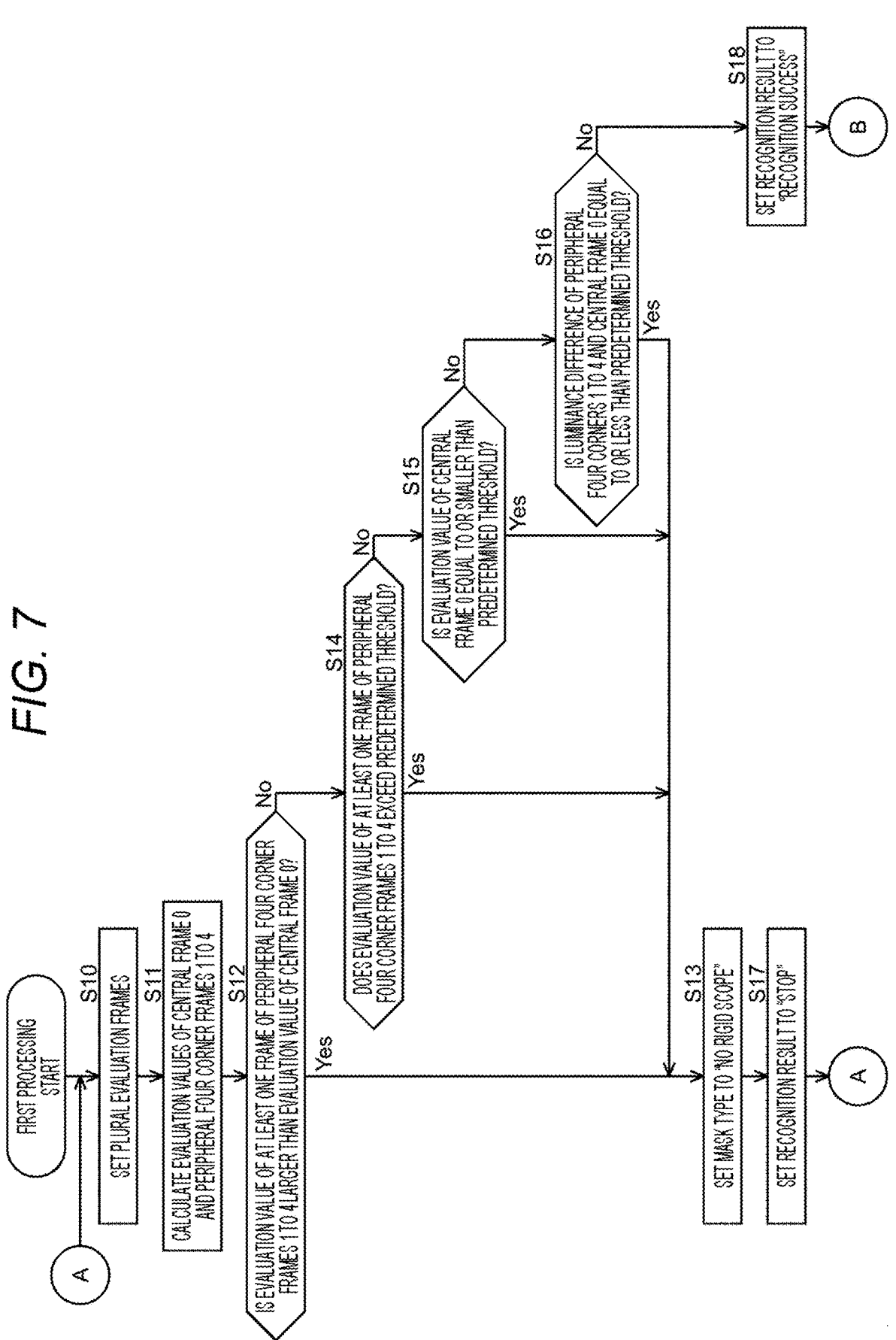
FIG. 7 is a flowchart illustrating a flow of first processing.

Returning to the description of FIG. 7, in step S11, the evaluation value calculation unit 182 calculates evaluation values corresponding to the central frame 0 and the peripheral four corner frames 1 to 4 illustrated in FIG. 8. As the evaluation value, for example, a feature amount obtained from the endoscopic image 200 such as a luminance value can be used.

Note that, in the processing of step S11, for convenience of description, the evaluation values regarding the respective plurality of evaluation frames 210 are collectively calculated, but the evaluation values regarding the target evaluation frames 210 may be sequentially calculated for each determination processing (S12, S14, S15, S16) to be described later. The method of calculating the evaluation value is similar in the second processing and the third processing described later.

In step S12, the evaluation value determination unit 183 determines whether or not the evaluation value of at least one frame among the peripheral four corner frames 1 to 4 is larger than the evaluation value of the central frame 0 on the basis of the calculation result of the evaluation value of each frame.

In a case where it is determined in the determination processing of step S12 that the evaluation values of the peripheral four corner frames 1 to 4 are larger than the evaluation value of the central frame 0, that is, in a case where it is determined that the central portion of the endoscopic image 200 is dark and the peripheral portion thereof is bright, the processing proceeds to step S13. Then, in step S13, the determination result setting unit 184 sets the mask type to "No rigid scope".

In addition, in a case where it is determined in the determination processing of step S12 that the evaluation values of the peripheral four corner frames 1 to 4 are smaller than the evaluation value of the central frame 0, the processing proceeds to step S14. In step S14, the evaluation value determination unit 183 determines whether or not the evaluation value of at least one frame among the peripheral four corner frames 1 to 4 exceeds a predetermined threshold on the basis of the calculation result of the evaluation value of the target frame.

In a case where it is determined in the determination processing of step S14 that the evaluation values of the peripheral four corner frames 1 to 4 exceed the predetermined threshold, that is, the entire image is bright, the processing proceeds to step S13, and "No rigid scope" is set as the mask type.

Furthermore, in a case where it is determined in the determination processing of step S14 that the evaluation values of the peripheral four corner frames 1 to 4 are equal to or less than the predetermined threshold, the processing proceeds to step S15. In step S15, the evaluation value determination unit 183 determines whether or not the evaluation value of the central frame 0 is equal to or less than a predetermined threshold on the basis of the calculation result of the evaluation value of the target frame.

In a case where it is determined in the determination processing of step S15 that the evaluation value of the central frame 0 is equal to or less than the threshold, that is, in a case where it is determined that the endoscopic image 200 includes a black image as a whole, the processing proceeds to step S13, and "No rigid scope" is set as the mask type.

Furthermore, in a case where it is determined in the determination processing of step S15 that the evaluation value of the central frame 0 exceeds the predetermined threshold, the processing proceeds to step S16. In step S16, the evaluation value determination unit 183 determines whether or not the luminance difference between the peripheral four corner frames 1 to 4 and the central frame 0 is a predetermined threshold or less on the basis of the calculation result of the evaluation value of the target frame.

In a case where it is determined in the determination processing of step S16 that the luminance difference is the predetermined threshold or less, the processing proceeds to step S13, and "No rigid scope" is set as the mask type.

In a case where it is determined as affirmative ("Yes") in the determination processing of steps S12, S14, S15, and S16, "No rigid scope" is set as the mask type (S13), and the processing proceeds to step S17. In step S17, the determination result setting unit 184 sets the recognition result to "STOP". Thereafter, the processing returns to step S10, and the first processing described above is repeated.

Furthermore, in a case where it is determined in the determination processing of step S16 that the luminance difference exceeds the predetermined threshold, the processing proceeds to step S18. In step S18, the determination result setting unit 184 sets the recognition result to "Recognition success". Thereafter, the processor 161 of the control device 51 executes second processing subsequent to the first processing. Note that details of the second processing will be described later with reference to FIG. 9 and the like.

<Flow of Second Processing>

Next, a flow of the second processing executed by the processor 161 of the control device 51 will be described with reference to a flowchart of FIG. 9.

In step S30, the evaluation frame setting unit 181 sets a plurality of evaluation frames for the image according to the image signal from the camera head 102. In the setting of the evaluation frames, for example, as illustrated in FIG. 10, the evaluation frames 210 are provided at the central portion of the endoscopic image 200 and in a horizontal direction (X direction) thereof.

Specifically, in the endoscopic image 200, an evaluation frame 210-4 (hereinafter, abbreviated as an evaluation frame 4) made of a rectangle is provided at the central portion including an approximate center of gravity. In addition, rectangular evaluation frames 210-0 to 210-3 (hereinafter, also abbreviated as evaluation frames 0, 1, 2, and 3) are provided at predetermined intervals on the left side in the horizontal direction, and rectangular evaluation frames 210-5 to 210-8 (hereinafter, also abbreviated as evaluation frames 5, 6, 7, and 8) are provided at predetermined intervals on the right side in the horizontal direction so as to be substantially symmetric about (the approximate center of gravity included in) the central portion of the endoscopic image 200.

The sizes of the rectangles of the evaluation frames 210-0 to 210-3 and the evaluation frames 210-5 to 210-8 discretely arranged at predetermined intervals on the left and right of the central portion are smaller than the size of the rectangle of the evaluation frame 210-4 arranged in the central portion. Note that, in the present disclosure, discrete means that the plurality of evaluation frames 210 is not continuously arranged.

Figure 10:
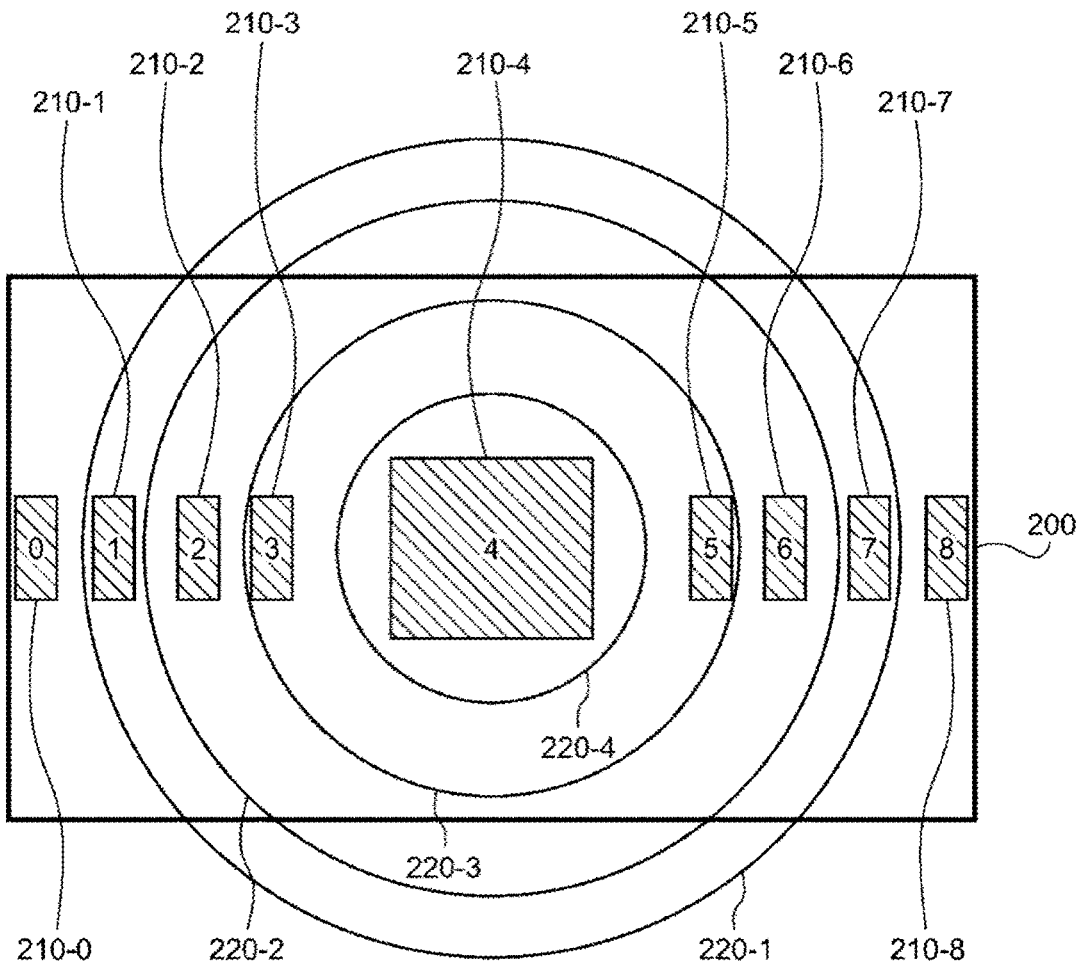
FIG. 10 is a diagram illustrating an example of a plurality of evaluation frames set in the second processing.

In FIG. 10, the evaluation frames 0 to 8 are discretely provided at predetermined intervals in the horizontal direction in the endoscopic image 200 in order to discriminate which (mask type of) mask edge 220 among the mask edges 220-1 to 220-4 the diameter of the scope 101 to be used corresponds to.

Specifically, for example, since the position where the mask edge 220-1 is detected is known in design, the evaluation frames 0 and 1, and the evaluation frames 7 and 8 are provided such that the detection position of the mask edge 220-1 is located between the evaluation frames 210. Similarly, the detection position of the mask edge 220-2 is set between the evaluation frames 1 and 2 and between the evaluation frames 6 and 7, the detection position of the mask edge 220-3 is set between the evaluation frames 2 and 3 and between the evaluation frames 5 and 6, and the detection position of the mask edge 220-4 is set between the evaluation frames 3 and 4 and between the evaluation frames 4 and 5.

Figure 9:
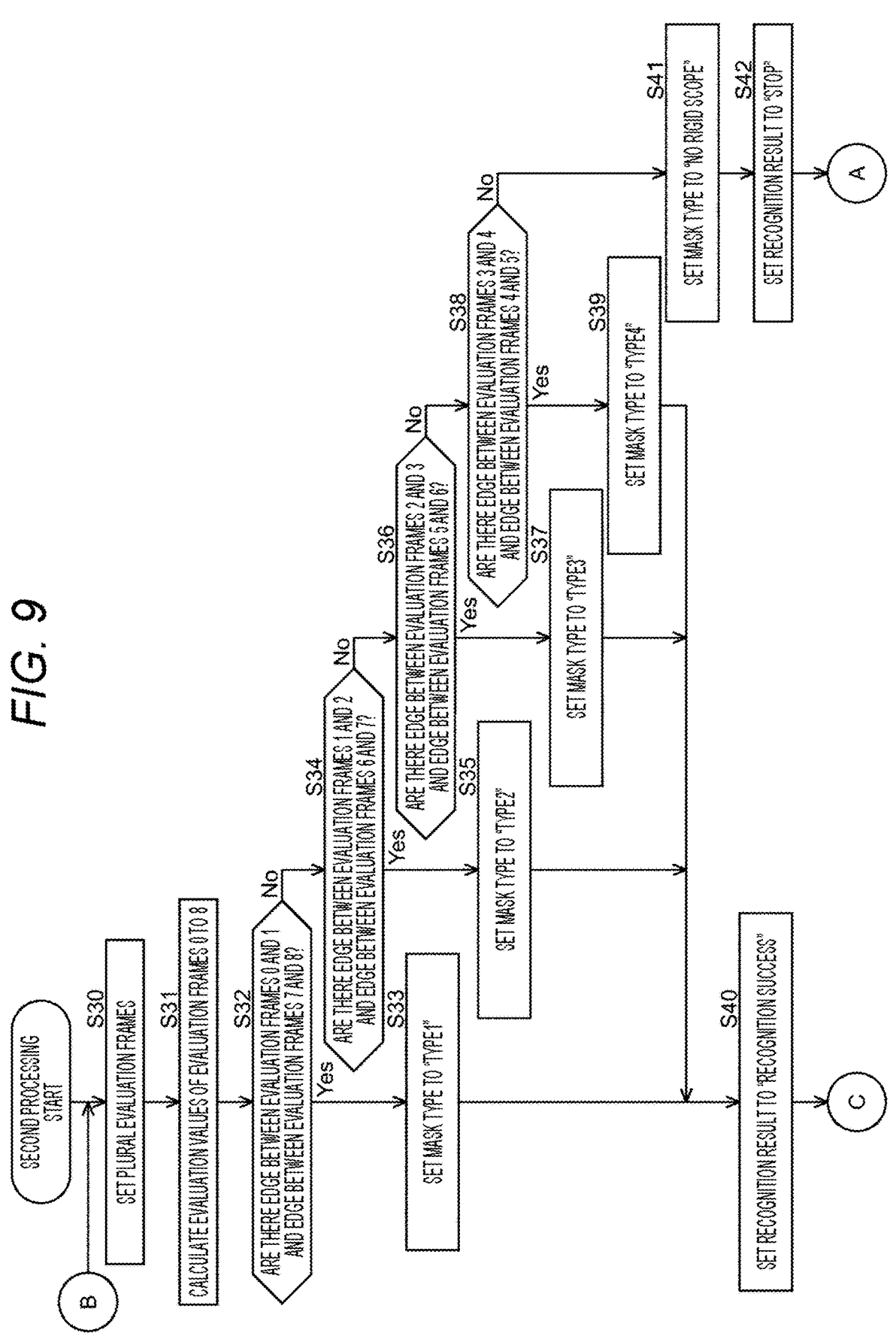
FIG. 9 is a flowchart illustrating a flow of second processing.

Returning to the description of FIG. 9, in step S31, the evaluation value calculation unit 182 calculates evaluation values corresponding to the evaluation frames 0 to 8 illustrated in FIG. 10. As the evaluation value, for example, a feature amount obtained from the endoscopic image 200 such as a luminance value can be used.

In step S32, the evaluation value determination unit 183 determines whether or not there is an edge between the evaluation frames 0 and 1 and there is an edge between the evaluation frames 7 and 8 on the basis of the calculation results of the evaluation values of the evaluation frames 0 and 1 and the evaluation frames 7 and 8.

Here, for example, the difference between the luminance value obtained from the evaluation frame 0 and the luminance value obtained from the evaluation frame 1 and the difference between the luminance value obtained from the evaluation frame 7 and the luminance value obtained from the evaluation frame 8 are compared with a predetermined threshold, and it is determined whether or not the luminance difference exceeds a predetermined threshold, whereby it is possible to determine whether or not there is an edge (mask edge 220-1) between the evaluation frames 210.

That is, it is determined whether or not a ratio between the average value of the luminance values in the evaluation frame 0 and the average value of the luminance values in the evaluation frame 1 exceeds a predetermined threshold, so that it can be determined whether or not there is an edge between the evaluation frame 0 and the evaluation frame 1. Similarly, whether or not there is an edge between the evaluation frame 7 and the evaluation frame 8 can be determined by determining whether or not the ratio between the average value of the luminance values in the evaluation frame 7 and the average value of the luminance values in the evaluation frame 8 exceeds a predetermined threshold.

Alternatively, threshold determination may be performed for each integration value of the luminance values in each evaluation frame. This integral value can be obtained by dividing the total value of the luminance values of all the pixels in each evaluation frame by the number of pixels. That is, it is determined whether or not the integrated value of the luminance values in the evaluation frame 0 exceeds a threshold (X) and whether or not the integrated value of the luminance values in the evaluation frame 1 exceeds the threshold (X), it is possible to determine whether or not there is an edge between the evaluation frame 0 and the evaluation frame 1 on the basis of the determination results. The similar applies to the evaluation frames 7 and 8. The threshold (X) is managed in a table, and for example, different values are set for the vignetting area 200A and the observation area 200B.

Here, for convenience of description, an example has been described in which the integration values of the luminance values of the evaluation frames 0 and 1 are subjected to threshold determination, and the presence or absence of the edge is determined on the basis of whether or the determination result satisfies the predetermined condition. However, for example, the presence or absence of the edge may be determined according to whether or not the integration values of the respective luminance values of the evaluation frames 0 to 3 are subjected to threshold determination, and the determination result satisfies the predetermined condition. Note that, as the luminance value in each evaluation frame, statistics such as a maximum value, a median value, and a variance value can be used in addition to the average value and the integral value.

In a case where it is determined as affirmative ("Yes") in the determination processing of step S32, the processing proceeds to step S33. In step S33, the determination result setting unit 184 sets the mask type to "TYPE1".

Furthermore, in a case where it is determined as negative ("No") in the determination processing of step S32, the processing proceeds to step S34. In step S34, the evaluation value determination unit 183 determines whether or not there is an edge between the evaluation frames 1 and 2 and there is an edge between the evaluation frames 6 and 7 on the basis of the calculation results of the evaluation values of the evaluation frames 1 and 2 and the evaluation frames 6 and 7. In a case where it is determined as affirmative in the determination processing of step S34, the processing proceeds to step S35. In step S35, the determination result setting unit 184 sets the mask type to "TYPE2".

Furthermore, in a case where it is determined as negative in the determination processing of step S34, the processing proceeds to step S36. In step S36, the evaluation value determination unit 183 determines whether or not there is an edge between the evaluation frames 2 and 3 and there is an edge between the evaluation frames 5 and 6 on the basis of the calculation results of the evaluation values of the evaluation frames 2 and 3 and the evaluation frames 5 and 6. In a case where it is determined as affirmative in the determination processing of step S36, the processing proceeds to step S37. In step S37, the determination result setting unit 184 sets the mask type to "TYPE3".

Furthermore, in a case where it is determined as negative in the determination processing of step S36, the processing proceeds to step S38. In step S38, the evaluation value determination unit 183 determines whether or not there is an edge between the evaluation frames 3 and 4 and there is an edge between the evaluation frames 4 and 5 on the basis of the calculation results of the evaluation values of the evaluation frames 3 and 4 and the evaluation frames 4 and 5. In a case where it is determined as affirmative in the determination processing of step S38, the processing proceeds to step S39. In step S39, the determination result setting unit 184 sets the mask type to "TYPE4".

In a case where it is determined as affirmative in the determination processing of steps S32, S34, S36, and S38, "TYPE1", "TYPE2", "TYPE3", and "TYPE4" are set as mask types (S33, S35, S37, S39), and the processing proceeds to step S40. In step S40, the determination result setting unit 184 sets the recognition result to "Recognition success". Thereafter, the processor 161 of the control device 51 executes the third processing subsequent to the second processing. Note that details of the third processing will be described later with reference to FIG. 11 and the like.

Furthermore, in a case where it is determined as negative in the determination processing of step S38, the processing proceeds to step S41. Then, the determination result setting unit 184 sets the mask type to "No rigid scope" (S41) and sets the recognition result to "STOP" (S42). Thereafter, the processing returns to step S10 in FIG. 7, and the above-described first processing is executed.

<Flow of Third Processing>

Next, a flow of third processing executed by the processor 161 of the control device 51 will be described with reference to a flowchart of FIG. 11.

In step S50, the determination result setting unit 184 determines whether or not the mask type has been set to "TYPE3" or "TYPE4" in the second processing. That is, in this example, since the detection positions in the vertical direction of the mask edges 220-1 and 220-2, which are "TYPE1" and "TYPE2", are located outside the endoscopic image 200, the processing related to the mask edges 220-1 and 220-2 is excluded.

In a case where it is determined as affirmative in the determination processing of step S50, the processing proceeds to step S51. In step S51, the evaluation frame setting unit 181 sets a plurality of evaluation frames for the image according to the image signal from the camera head 102. In the setting of the evaluation frames, for example, as illustrated in FIG. 12, the evaluation frames 210 are provided at the central portion of the endoscopic image 200 and in the vertical direction (Y direction) thereof.

Specifically, in the endoscopic image 200, an evaluation frame 210-4 (hereinafter, abbreviated as an evaluation frame 4) formed in a rectangle is provided at the central portion including an approximate center of gravity. In addition, rectangular evaluation frames 210-0 and 210-1 (hereinafter, also abbreviated as evaluation frames 0 and 1) are provided at predetermined intervals on an upper side in the vertical direction, and rectangular evaluation frames 210-2 and 210-3 (hereinafter, also abbreviated as evaluation frames 2 and 3) are provided at predetermined intervals on a lower side in the vertical direction so as to be substantially symmetric about (the approximate center of gravity included in) the central portion of the endoscopic image 200.

The sizes of the rectangles of the evaluation frames 210-0 and 210-1 and the evaluation frames 210-2 and 210-3 discretely arranged at predetermined intervals above and below the central portion are smaller than the size of the rectangle of the evaluation frame 210-4 arranged at the central portion.

Figure 12:
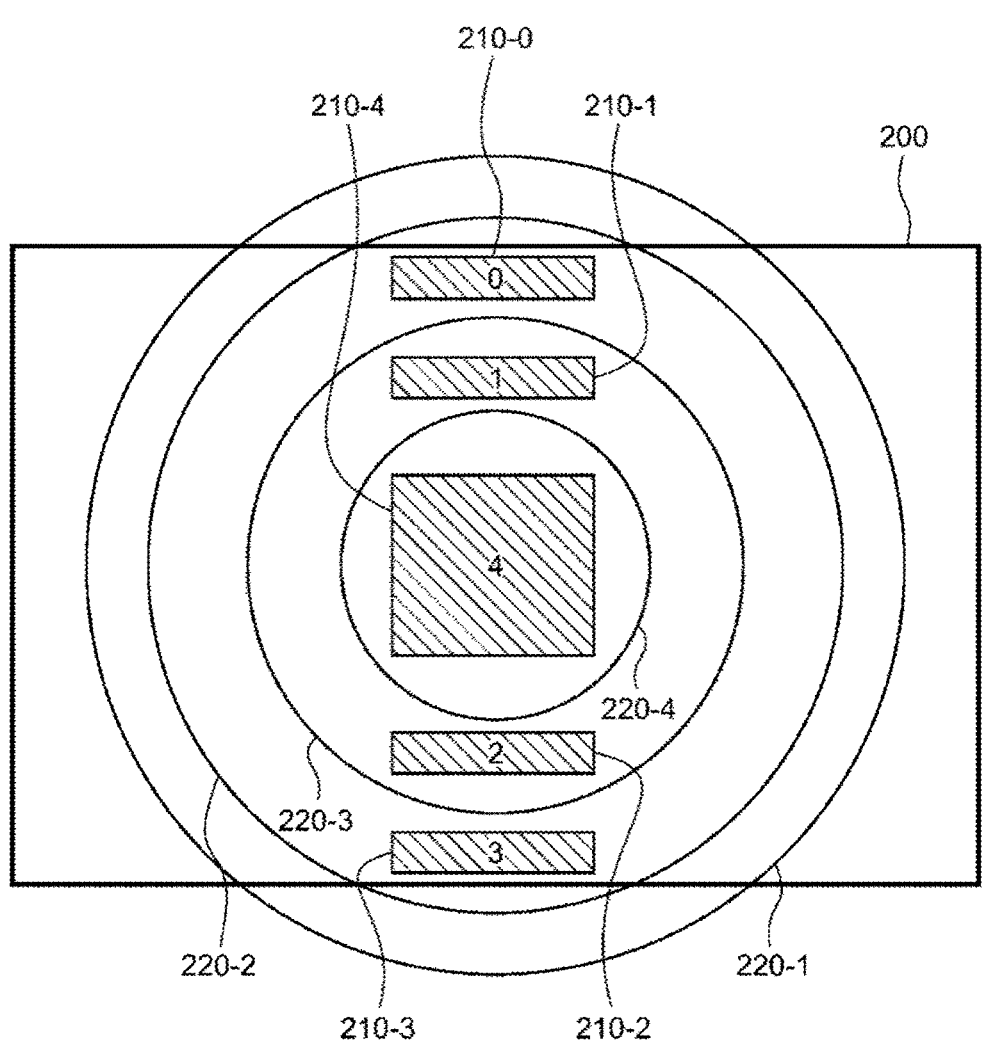
FIG. 12 is a diagram illustrating an example of a plurality of evaluation frames set in the third processing.

In FIG. 12, the evaluation frames 210-0 to 210-3 are discretely provided at predetermined intervals in the vertical direction in the endoscopic image 200 in order to discriminate which (mask type of) mask edge 220 among the mask edges 220-3 and 220-4 the diameter of the scope 101 to be used corresponds to. Specifically, the detection position of the mask edge 220-3 is set between the evaluation frames 0 and 1 and between the evaluation frames 2 and 3, and the detection position of the mask edge 220-4 is set between the evaluation frames 1 and 4 and between the evaluation frames 2 and 4.

Figure 11:
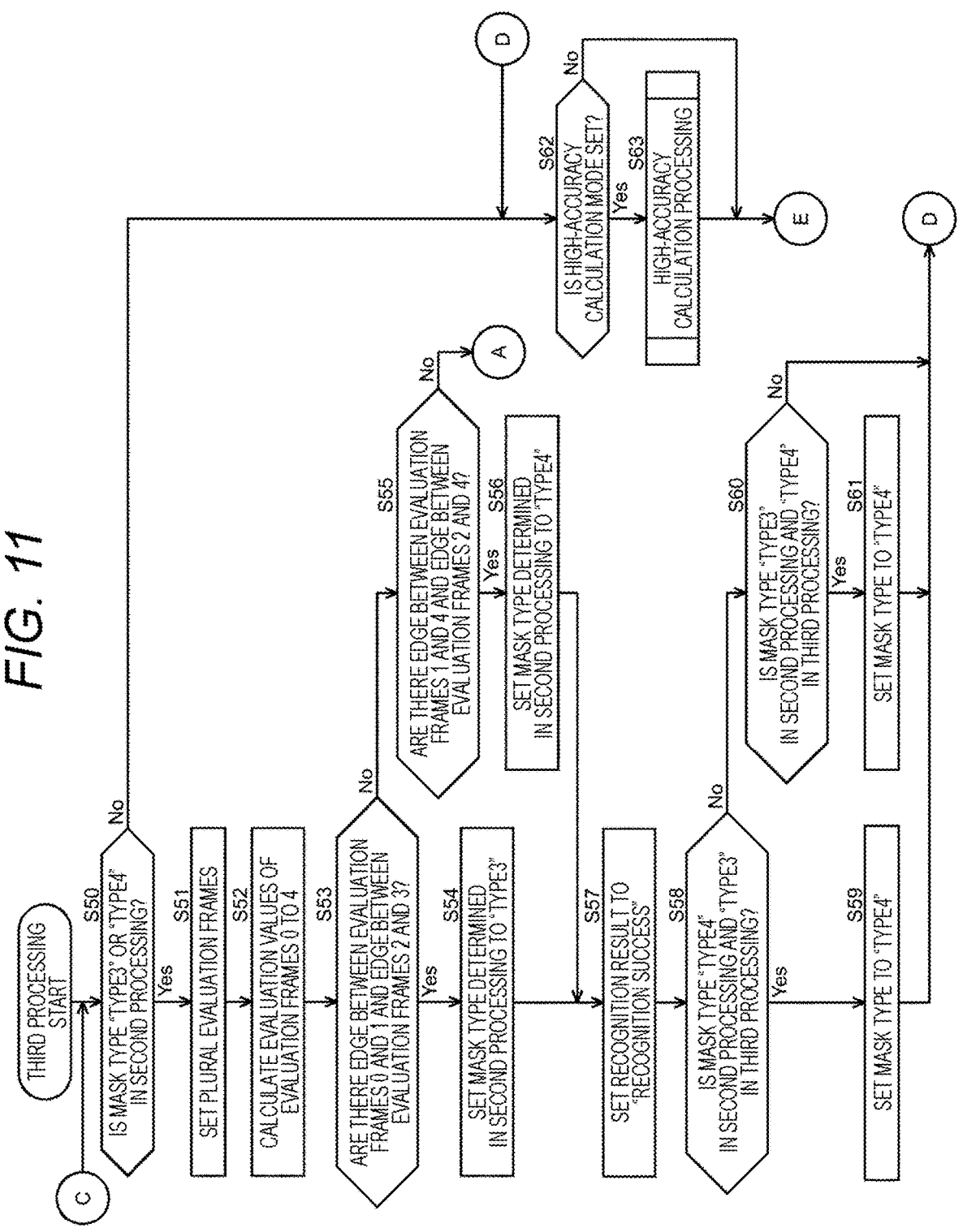
FIG. 11 is a flowchart illustrating a flow of third processing.

Returning to the description of FIG. 11, in step S52, the evaluation value calculation unit 182 calculates evaluation values corresponding to the evaluation frames 0 to 4 illustrated in FIG. 12. As the evaluation value, for example, a feature amount obtained from the endoscopic image 200 such as a luminance value can be used.

In step S53, the evaluation value determination unit 183 determines whether or not there is an edge between the evaluation frames 0 and 1 and there is an edge between the evaluation frames 2 and 3 on the basis of the calculation results of the evaluation values of the evaluation frames 0 and 1 and the evaluation frames 2 and 3.

Here, for example, the difference between the luminance value obtained from the evaluation frame 0 and the luminance value obtained from the evaluation frame 1 and the difference between the luminance value obtained from the evaluation frame 2 and the luminance value obtained from the evaluation frame 3 are compared with a predetermined threshold, and it is determined whether or not the luminance difference exceeds a predetermined threshold, whereby it is possible to determine whether or not there is an edge (mask edge 220-3) between the evaluation frames 210.

That is, it is determined whether or not a ratio between the average value of the luminance values in the evaluation frame 0 and the average value of the luminance values in the evaluation frame 1 exceeds a predetermined threshold, so that it can be determined whether or not there is an edge between the evaluation frame 0 and the evaluation frame 1. Similarly, whether or not there is an edge between the evaluation frame 2 and the evaluation frame 3 can be determined by determining whether or not the ratio between the average value of the luminance values in the evaluation frame 2 and the average value of the luminance values in the evaluation frame 3 exceeds a predetermined threshold.

Alternatively, threshold determination may be performed for each integration value of the luminance values in each evaluation frame. That is, it is determined whether or not the integrated value of the luminance values in the evaluation frame 0 exceeds a threshold (X) and whether or not the integrated value of the luminance values in the evaluation frame 1 exceeds the threshold (X), it is possible to determine whether or not there is an edge between the evaluation frame 0 and the evaluation frame 1 on the basis of the determination results. The similar applies to the evaluation frames 2 and 3. The threshold (X) is managed in a table.

In a case where it is determined as affirmative in the determination processing of step S53, the processing proceeds to step S54. In step S54, the determination result setting unit 184 sets the mask type determined in the second processing to "TYPE3".

Furthermore, in a case where it is determined as negative in the determination processing of step S53, the processing proceeds to step S55. In step S55, the evaluation value determination unit 183 determines whether or not there is an edge between the evaluation frames 1 and 4 and there is an edge between the evaluation frames 2 and 4 on the basis of the calculation results of the evaluation values of the evaluation frames 1 and 4 and the evaluation frames 2 and 4. In a case where it is determined as affirmative in the determination processing of step S55, the processing proceeds to step S56. In step S56, the determination result setting unit 184 sets the mask type determined in the second processing to "TYPE4".

Processing of step S54 or S56 is finished, and then the processing proceeds to step S57. Then, in step S57, the determination result setting unit 184 sets the recognition result to "Recognition success". In step S58, the determination result setting unit 184 determines whether or not the mask type determined in the second processing is set to "TYPE4" and the mask type determined in the third processing is set to "TYPE3".

In a case where it is determined in the determination processing of step S58 to cut out the image, the processing proceeds to step S59. In step S59, the determination result setting unit 184 sets the mask type to "TYPE4". That is, in this case, for example, assuming that the mask diameter in the vertical direction is detected to be large due to light leakage, the mask diameter detected in the horizontal direction by the second processing is adopted. In this way, a narrower mask diameter is selected and determined, so that, for example, it is possible to more reliably prevent the vignetting area 200A from being included when the subsequent processing is performed.

Furthermore, in a case where it is determined as negative in the determination processing of step S58, the processing proceeds to step S60. In step S60, the evaluation value determination unit 183 determines whether or not the mask type determined in the second processing is set to "TYPE3" and the mask type determined in the third processing is set to "TYPE4".

In a case where it is determined as affirmative in the determination processing of step S60, the processing proceeds to step S61. In step S61, the determination result setting unit 184 sets the mask type to "TYPE4". That is, in this case, assuming that the mask diameter in the horizontal direction is detected to be large due to light leakage, for example, the mask diameter detected in the vertical direction by the third processing is adopted to more reliably prevent the vignetting area 200A from entering.

In a case where the processing of step S59 or S61 ends, or it is determined as negative in the determination processing of step S60, the processing proceeds to step S62. Furthermore, also in a case where it is determined as negative in the determination processing of step S50 described above, the processing proceeds to step S62.

In step S62, it is determined whether or not the high-accuracy calculation mode is set as an operation mode. Here, when a mode for executing the first processing to the third processing is referred to as a normal mode, a mode for calculating the size of the mask diameter with high accuracy as compared with the normal mode is referred to as a high-accuracy calculation mode. In the processing in the normal mode, the first processing to the third processing are executed. In the processing in the high-accuracy calculation mode, high-accuracy calculation processing (S63) is performed in addition to the first processing to the third processing.

In a case where it is determined in step S62 that the high-accuracy calculation mode is set, the processing proceeds to step S63. In step S63, the processor 161 of the control device 51 executes high-accuracy calculation processing. Details of the high-accuracy calculation processing will be described later with reference to FIGS. 13 and 14.

In a case where it is determined in step S62 that the high-accuracy calculation mode is not set, that is, the normal mode is set, the processing of step S63 is skipped. Then, when the processing of step S63 is executed in the high-accuracy calculation mode or the processing of step S63 is skipped in the normal mode, the processor 161 of the control device 51 executes determination processing to be described later with reference to FIG. 15 and the like.

The flow of the first processing to the third processing has been described above. In the first processing, as illustrated in FIG. 8, the central frame 0 and the peripheral four corner frames 1 to 4 are set as the evaluation frames 210 for the endoscopic image 200, and whether or not the vignetting area 200A (mask area) is included in the endoscopic image 200 is determined on the basis of the relationship between the evaluation values regarding the respective evaluation frames 210. Then, in a case where the vignetting area 200A is not included, the first processing is repeated, and in a case where the vignetting area 200A is included, the second processing is executed.

Furthermore, in the second processing, as illustrated in FIG. 10, each of the evaluation frames 210-0 to 210-8 is discretely arranged at predetermined intervals in the horizontal direction with respect to the endoscopic image 200, and the mask type according to the position of the edge is set on the basis of a relationship between the evaluation values regarding each of the evaluation frames 210. Then, the first processing is repeated in a case where the edge corresponding to the evaluation frame 210 is not detected, and the third processing is executed in a case where the edge corresponding to the evaluation frame 210 is detected.

Furthermore, in the third processing, as illustrated in FIG. 12, each of the evaluation frames 210-0 to 210-4 is discretely set at predetermined intervals in the vertical direction with respect to the endoscopic image 200, and the mask type according to the position of the edge is set (reset) on the basis of the relationship between the evaluation values regarding each of the evaluation frames 210. Then, in a case where the normal mode is set as the operation mode, determination processing to be described later is executed after the processing of the normal mode is completed. Furthermore, in a case where the high-accuracy calculation mode is set, determination processing to be described later is executed after the processing of the high-accuracy calculation mode is completed.

Note that, in the above description, a case where evaluation is performed by setting the evaluation frames 210 in both the horizontal direction and the vertical direction such that the plurality of evaluation frames 210 is point-symmetric with respect to the approximate center of gravity of the endoscopic image 200 by executing the second processing and the third processing has been described. However, evaluation may be performed by setting the evaluation frames 210 only in one of the horizontal direction and the vertical direction by executing the second processing or the third processing. However, as described above, when the evaluation frames 210 are set from both the horizontal direction and the vertical direction by executing the second processing and the third processing, the mask type can be set assuming, for example, light leakage and the like, so that the mask type can be set more accurately.

Furthermore, in the second processing and the third processing, the case where the plurality of evaluation frames 210 is discretely arranged at predetermined intervals has been described, but some of the evaluation frames 210 may be continuously arranged. Furthermore, the number of the plurality of evaluation frames 210 discretely arranged is arbitrary, and for example, a larger number of evaluation frames 210 may be provided for the detection position of the mask edge 220. A position where the plurality of evaluation frames 210 is arranged is also arbitrary. Furthermore, the shape of the evaluation frames 210 discretely arranged is not limited to a rectangle, and may be another shape, and it is not necessary that all the evaluation frames 210 have the same shape. The intervals at which the plurality of evaluation frames 210 is arranged may not be constant intervals.

Furthermore, in the second processing and the third processing, the example in which the edge (mask edge 220) is detected by using the luminance value as the evaluation value and comparing the luminance difference with the predetermined threshold has been described. However, for example, the edge may be detected by using a quantitative value (for example, a feature amount such as an edge amount or a black area amount) representing an edge, a black area, or the like included in the evaluation frame 210 as the evaluation value.

<Details of High-Accuracy Calculation Processing>

Figure 13:
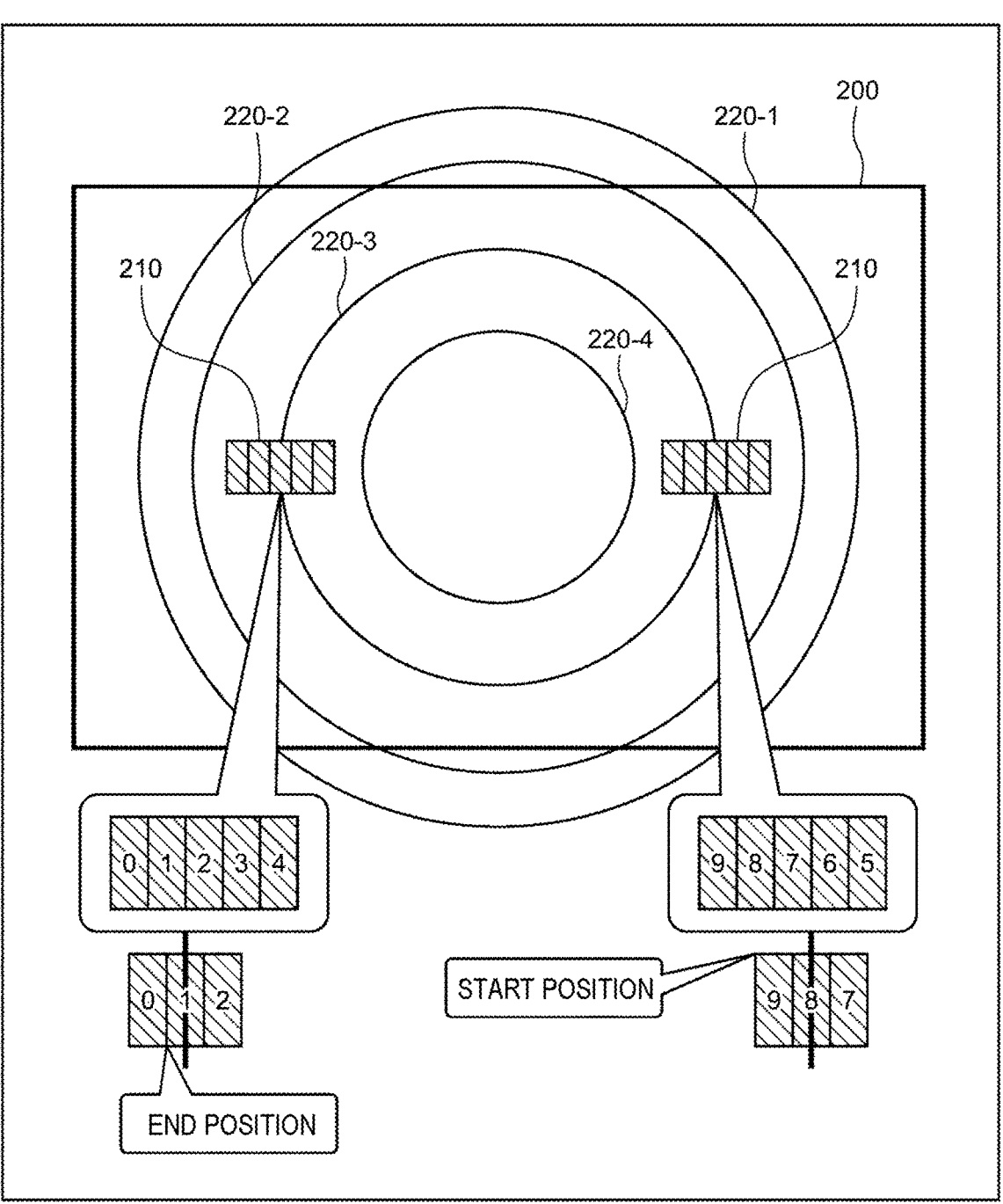
FIG. 13 is a diagram illustrating an example of a plurality of evaluation frames set in high-accuracy calculation processing.
Figure 14:
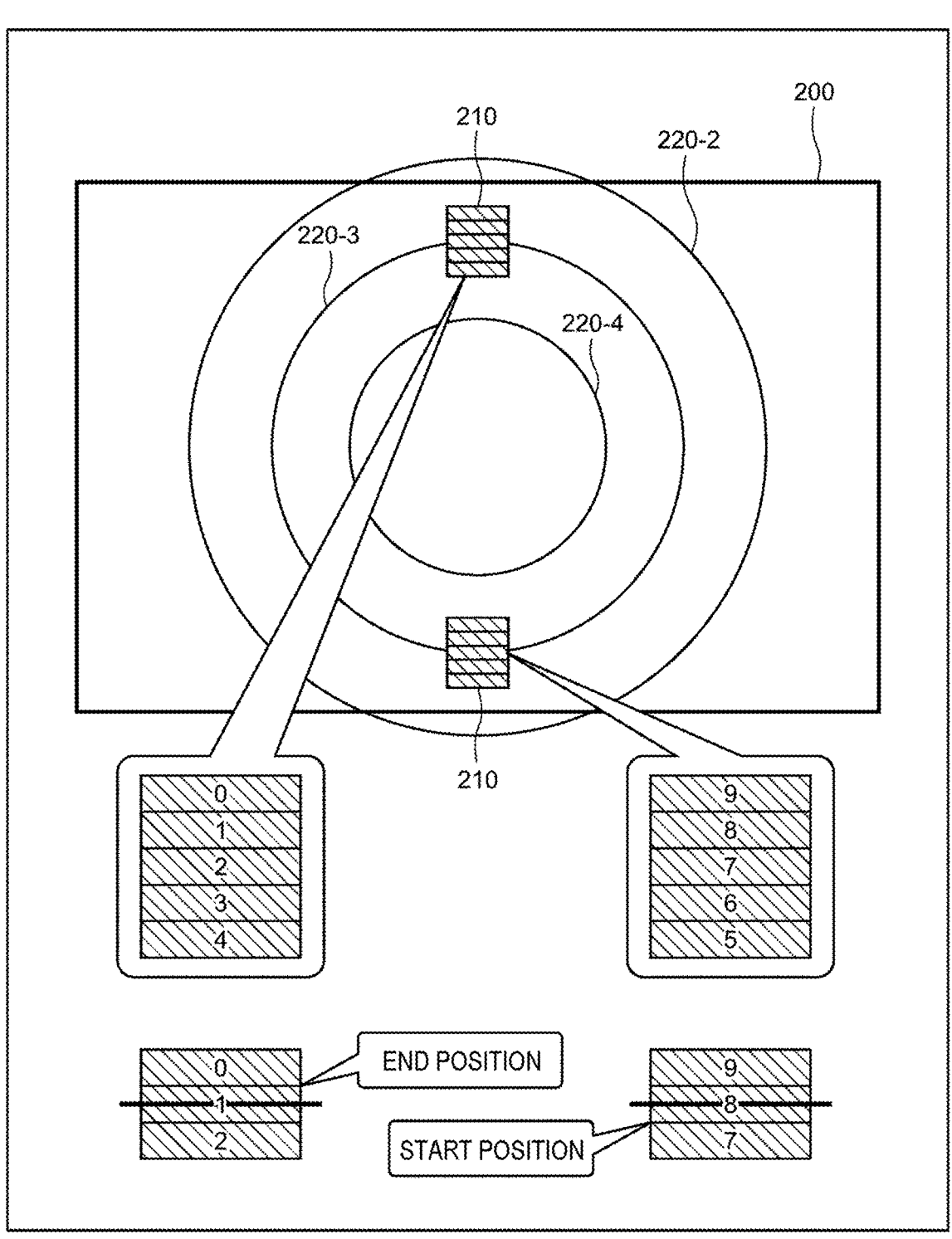
FIG. 14 is a diagram illustrating an example of a plurality of evaluation frames set in the high-accuracy calculation processing.

Next, details of the high-accuracy calculation processing corresponding to step S63 in FIG. 11 will be described with reference to FIGS. 13 and 14. Here, a case where "TYPE3" is set as the mask type in the above-described second processing and third processing will be exemplified.

First, in the high-accuracy calculation processing, processing for calculating a detailed mask edge in the horizontal direction (X direction) is performed according to the determination results in the second processing and the third processing described above. In this example, since "TYPE3" is set as the mask type, as illustrated in FIG. 13, a plurality of evaluation frames 210 is set according to the detection position of the mask edge 220-3.

Specifically, each of the evaluation frames 210-0 to 210-4 corresponding to the detection position of the mask edge 220-3 is continuously provided on the left side in the horizontal direction, and each of the evaluation frames 210-5 to 200-9 corresponding to the detection position of the mask edge 220-3 is continuously provided on the right side in the horizontal direction so as to be substantially symmetric (left-right symmetric with the Y axis as a symmetry axis) about the approximate center of gravity of the endoscopic image 210.

The sizes of the rectangles of the evaluation frames 210-0 to 210-4 and the rectangles of the evaluation frames 210-5 to 210-9, which are continuously arranged symmetrically, have substantially the same shape and substantially the same size. Each evaluation frame 210 is provided with a start position and an end position in the horizontal direction (X direction). The start position indicates a position of the left end in the X direction in each evaluation frame 210, and the end position indicates a position of the right end in the X direction in each evaluation frame 210.

In this manner, the evaluation frames 210-0 to 210-4 and the evaluation frames 210-5 to 210-9 are symmetrically and continuously arranged in the horizontal direction with respect to the endoscopic image 200, so that the edge left end position and the edge right end position in the mask diameter can be set on the basis of the relationship between the evaluation values regarding the respective evaluation frames 210.

Next, in the high-accuracy calculation processing, processing for calculating a detailed mask edge in the vertical direction (Y direction) is performed according to the determination results in the second processing and the third processing described above. In this example, since "TYPE3" is set as the mask type, as illustrated in FIG. 14, a plurality of evaluation frames 210 is provided according to the detection position of the mask edge 220-3.

Specifically, each of the evaluation frames 210-0 to 210-4 corresponding to the detection position of the mask edge 220-3 is continuously provided on the upper side in the vertical direction, and each of the evaluation frames 210-5 to 200-9 corresponding to the detection position of the mask edge 220-3 is continuously provided on the lower side in the vertical direction so as to be substantially symmetric (vertically symmetric with the X axis as a symmetry axis) about the approximate center of gravity of the endoscopic image 210.

The sizes of the rectangles of the evaluation frames 210-0 to 210-4 and the rectangles of the evaluation frames 210-5 to 210-9, which are continuously arranged vertically symmetrically, have substantially the same shape and substantially the same size. Each evaluation frame 210 is provided with a start position and an end position in the vertical direction (Y direction). The start position indicates a position of the upper end in the Y direction in each evaluation frame 210, and the end position indicates a position of the lower end in the Y direction in each evaluation frame 210.

In this manner, the evaluation frames 210-0 to 210-4 and the evaluation frames 210-5 to 210-9 are vertically symmetrically and continuously arranged in the vertical direction with respect to the endoscopic image 200, so that the edge upper end position and the edge lower end position in the mask diameter can be set on the basis of the relationship between the evaluation values regarding the respective evaluation frames 210.

As described above, in a case where the high-accuracy calculation processing is performed, the mask type of the vignetting area 200A included in the endoscopic image 200 is set on the basis of the relevance of the evaluation values corresponding to the plurality of evaluation frames 210, and the edge left end position, the edge right end position, the edge upper end position, and the edge lower end position in the mask diameter corresponding to the mask type are set.

<Flow of Determination Processing>

Figure 15:
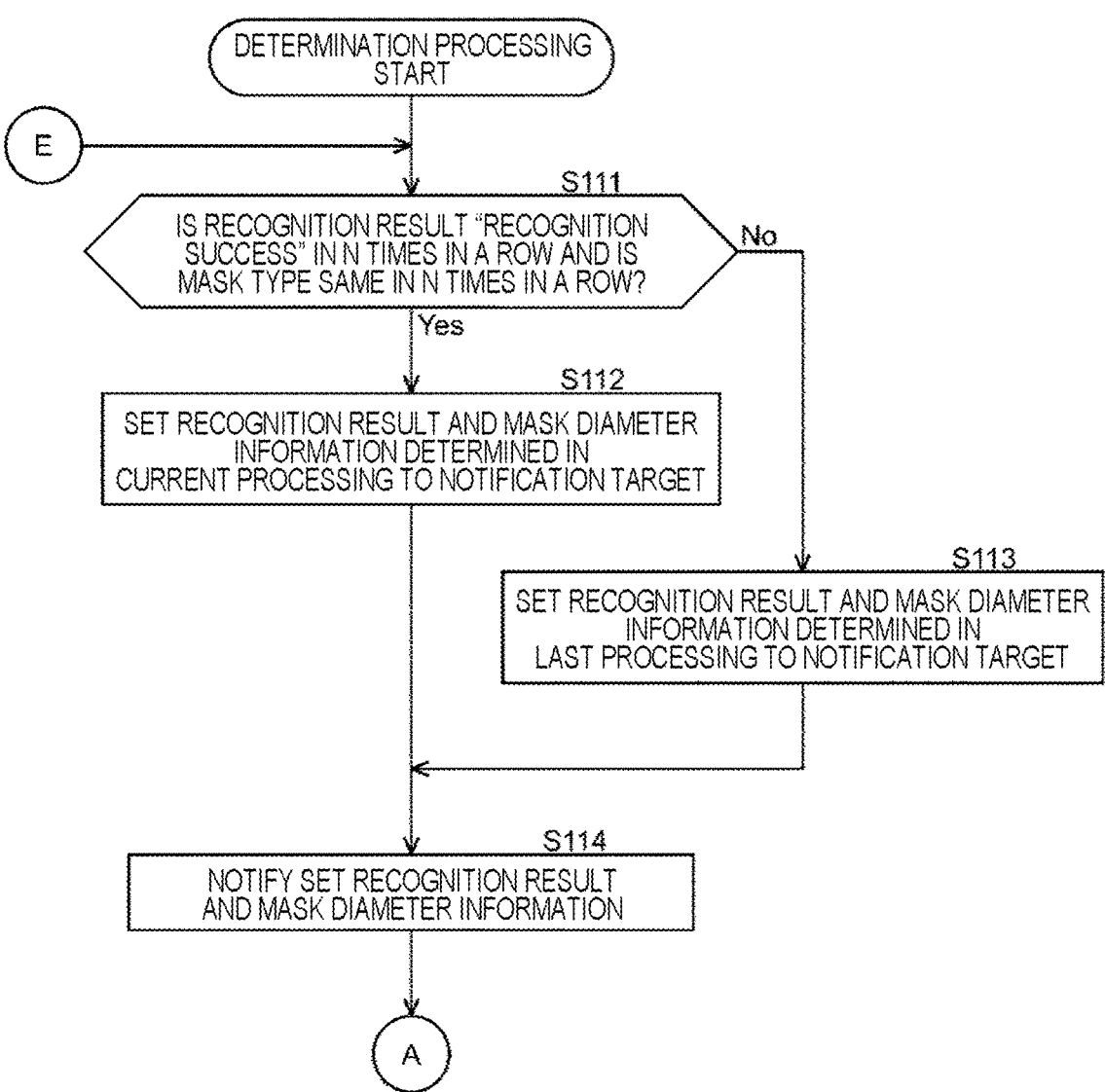
FIG. 15 is a flowchart illustrating a flow of determination processing.

Next, a flow of determination processing executed by the processor 161 of the control device 51 will be described with reference to a flowchart of FIG. 15. The determination processing is executed after the processing in the normal mode or the processing in the high-accuracy calculation mode is executed.

In step S111, the determination result determination unit 185 determines whether or not the recognition result is "Recognition success" N times in a row and the mask type is the same mask type N times in a row.

The number of consecutive times N is a number of times such as 10 times, and is compared with a preset threshold to determine whether or not the determination result (the recognition result and the mask diameter information) is the same for a predetermined number of consecutive times. For example, insertion of the scope 101 into the body of the patient 4 is performed through a trocar, but there is a possibility that erroneous determination may occur due to use of the trocar, such as leakage of light at that time. Here, the threshold is set by estimating the number of consecutive times N such as 10 times in order to withstand the disturbance on the basis of the real time of putting the scope 101 into the trocar.

For example, if a time interval (interval between one time and one time) between the processing in the normal mode repeated N times is expressed by the image frames output in time series, the time interval corresponds to about five frames. However, with an increase in the time interval to ten frames or the like, the number of consecutive times N can be reduced, and if the time interval is set to 60 frames, the disturbance can be avoided even by repeating 2 times. Here, it is stochastically appropriate to set the time interval between the processing to five frames and determine whether or not the determination results are the same for ten consecutive times on the basis of a result of a detailed simulation by the inventor(s) of the present disclosure. In addition, since an actual time for inserting the scope 101 into the trocar is assumed to be about 1 second, it is necessary to set a threshold according to a time interval and the number of consecutive times such that the parameter change processing based on the determination result of erroneous determination is not performed before and after the actual time.

The threshold used in the determination of the number of consecutive times N is not limited to the disturbance caused by the use of the trocar, and may be determined according to the disturbance caused by the presence of a high-luminance subject such as the forceps 23 or gauze in the imaging area of the image sensor 152. In addition, the threshold used in the determination of the number of consecutive times N may be changed according to the surgery mode or the observation mode. The operation mode includes modes corresponding to the operation such as a laparoscopic mode, a cystoscopic mode, and an ear, nose, and throat mode. For example, since the ear hole is narrow, it is easy to make an erroneous determination, and thus the threshold may be changed from 10 times to 60 times in a case where it is determined that the ear, nose, and throat mode is set.

The observation mode includes modes such as a normal light observation mode and a special light observation mode. The normal light observation mode is a mode in which a white image captured when white light is emitted from the light source device 53 is displayed on the display device 52. The special light observation mode is a mode in which a special light image captured when special light such as IR light or narrow band light is emitted from the light source device 53 is displayed on the display device 52.

In a case where it is determined as affirmative ("Yes") in the determination processing of step S111, the processing proceeds to step S112. In step S112, the notification target setting unit 186 sets the recognition result and mask diameter information determined in the current processing as notification targets to be notified the external module of.

On the other hand, in a case where it is determined as negative ("No") in the determination processing of step S111, the processing proceeds to step S113. In step S113, the notification target setting unit 186 sets the recognition result and mask diameter information determined in the previous processing as notification targets to be notified the external module of.

FIG. 16 is a diagram illustrating an example of the recognition result and mask diameter information notified the external module of.

As illustrated in FIG. 16, a value indicating "STOP" or "Recognition success" is set in the recognition result. In the mask diameter information, values indicating "TYPE0", "TYPE1", "TYPE2", "TYPE3", and "TYPE4" are set as mask types. "TYPE0" represents no (no rigid scope). "TYPE1", "TYPE2", "TYPE3", and "TYPE4" represent the size of the mask diameter, and the size of the mask diameter decreases in this order. That is, the largest size is "TYPE1" (large), the second largest size is "TYPE2" (medium), the third largest size is "TYPE3" (small), and the smallest size is "TYPE4" (minimum).

For example, in a case where ten times is set as a threshold used in the determination of the number of consecutive times N, the processing in the normal mode is repeated ten times at predetermined time intervals, and in a case where the recognition result obtained in the processing in the normal mode is "Recognition success" continuously ten times, and the mask type obtained in the processing in the normal mode is "TYPE4" continuously ten times, it is determined as affirmative ("Yes") in the determination processing of step S111. In this case (S111: "Yes"), a recognition result of "Recognition success" and a mask type of "TYPE4" are set as notification targets (S112).

Furthermore, in a case where the processing in the normal mode is repeated ten times at predetermined time intervals, and the recognition result obtained by the processing in the normal mode is not "Recognition success" continuously ten times (for example, in a case where at least one time is "STOP"), or in a case where the mask type obtained by the processing in the normal mode is not "TYPE4" continuously ten times (for example, in a case where at least one time is another mask type such as "TYPE3"), it is determined as negative ("No") in the determination processing of step S111.

In this case (S111: "No"), the recognition result and the mask type determined in the previous processing are set as the notification target, instead of the recognition result and the mask type obtained in the current processing (processing in the normal mode to be determined this time). That is, in the processing of the normal mode which is a target of the previous determination, in a case where the recognition result is "Recognition success" continuously ten times and the mask type is "TYPE4" continuously ten times, the recognition result of "Recognition success" and the mask type of "TYPE4" are set as the notification target (S113). Note that a default notification target at the start of processing can be set, and for example, the smallest size "TYPE4" (minimum) can be set as the default mask type.

The processing in step S112 or step S113 is finished, and then the processing proceeds to step S114. In step S114, the external module is notified of the set recognition result and mask diameter information.

The external module includes, for example, a module related to AE or AF. That is, in a case where AE or AF is executed, it is necessary to set an area of the evaluation frame in the observation area 200B which is an effective area in the endoscopic image 200. However, the recognition result and the mask diameter information are notified the module related to AE or AF of, so that the evaluation frame can be set in the observation area 200B. As a result, the module related to AE or AF can control AE or AF on the basis of the pixel signal in the evaluation frame set in the observation area 200B.

As described above, in the processing in the normal mode, the mask diameter information and the like are repeatedly determined at predetermined time intervals, and in a case where the determination result (mask diameter information and the like) is continuously the same a predetermined number of times (for example, ten times), the parameter change processing (for example, processing of changing the area of the AE or AF evaluation frame) based on the determination result (mask diameter information and the like) is executed. That is, only in a case where the determination results are continuously the same a predetermined number of times, the parameter is switched to the parameter corresponding to the determination result. Note that, in a case where the same notification target is repeatedly set to the same external module, the second and subsequent determination results may not be notified.

In a case where the processing in the high-accuracy calculation mode is executed, the high-accuracy calculation processing (S63) is executed in addition to the first processing to the third processing, and thus, an edge left end position, an edge right end position, an edge upper end position, and an edge lower end position of the mask diameter are set together with the recognition result and the mask diameter information. Therefore, the diameter of the mask diameter and the center position of the mask can be obtained using these edge positions.

For example, in a case where an allowable error range is narrow, or the like, it is necessary to more accurately obtain the mask diameter and the center position, and in this case, the high-accuracy calculation mode is set as the operation mode. In this case, the processing in the high-accuracy calculation mode is repeatedly executed, and for example, in a case where at least one of the diameter of the mask diameter and the center position of the mask is continuously the same a predetermined number of times (for example, ten times), the parameter change processing based on the determination result (at least one of the diameter of the mask diameter and the center position of the mask) can be executed. As a result, in the case of operating in the high-accuracy calculation mode, the diameter of the mask diameter and the center position of the mask are always obtained with high accuracy, and the evaluation frame can be set more accurately, so that appropriate AE and AF control can be executed.

When the processing of step S114 ends, a series of processing ends, the processing returns to step S10 of FIG. 7, and the above-described processing is repeated.

The flow of the determination processing has been described above. In this determination processing, in a case where a determination result (mask diameter information or the like) obtained by repeatedly determining the size of the observation area, which is an area different from the vignetting area generated on the image sensor 152 by the scope 101, at the predetermined time intervals is continuously the same a predetermined number of times, parameter change processing based on the determination result is executed. In other words, it can also be said that the size of the observation area is determined at least twice or more, and the parameter change processing is executed on the basis of a comparison result obtained by comparing two or more determination results. In addition, it can be said that the type (mask type) of the scope 101 is determined in order to determine the size of the observation area.

In this manner, the observation area determination processing (processing in the normal mode) corresponding to the type (mask type) of the scope 101 at predetermined time intervals is repeatedly performed, and it is determined whether or not the determination result continues for a predetermined number of consecutive times, so that it is possible to suppress erroneous determination when determining the observation area, for example, even in a case where there is an influence of disturbance. For example, even when a high-luminance subject such as the forceps 23 or gauze is present in the imaging area or when the scope 101 is inserted into the body of the patient through the trocar, it is possible to suppress erroneous determination when determining the observation area.

Modifications

Although it is assumed that the mask determination processing is executed when operating in the normal light observation mode, the mask determination processing may be executed when operating in the special light observation mode. Here, processing including at least the processing in the normal mode repeatedly executed at predetermined time intervals is referred to as mask determination processing. The mask determination processing may include determination processing. Alternatively, when the normal light observation mode is switched to the special light observation mode, a parameter based on a determination result (mask diameter information or the like) obtained during the operation in the normal light observation mode can be used. That is, when the mode is switched to the special light observation mode, it is preferable to stop the mask determination processing and use a parameter corresponding to the determination result when the operation is performed in the normal light observation mode immediately before switching to the special light observation mode at the time of the operation in the special light observation mode.

Since the image captured in the special light observation mode is different from the image captured in the normal light observation mode, it is necessary to add special processing, and the complexity of the system increases. On the other hand, it is very rare to replace the scope 101 during the observation in the special light observation mode. The replacement of the scope 101 is often performed when the insertion place is changed or the observation target is changed, and when the mode is switched to the special light observation mode, it is often desired to view the area viewed in the normal light observation mode by further performing some processing. Therefore, when the mode is switched to the special light observation mode, the setting of the normal light observation mode is used, so that it is possible to cope with the change without increasing the complexity of the system.

In addition, when the special light observation mode is switched to the normal light observation mode and the operation returns to the normal light observation mode, the mask determination processing is only required to be resumed. Switching between the normal light observation mode and the special light observation mode may be performed in accordance with an operation of the user on an input device 54, or may be performed in accordance with an operation on an operation unit provided by an operating room integration system (not illustrated) connected to the endoscopic surgery system 1 through a network.

Note that, during the operation in the special light observation mode, it is reasonable to stop the mask determination processing as described above, but in a case where the mask determination processing is performed, a value of the number of times N may be set to, for example, 60 times to be larger than that in the normal light observation mode, or the area of the evaluation frame of AE or AF may be fixedly set in the central portion.

In addition, also in a case where white light and IR light are alternately emitted from the light source device 53, it is preferable to stop the mask determination processing. The AE may be controlled only by the white image captured when the white light is emitted, or the mask determination processing may be performed by extracting the white image by the image processing. However, since it is rare to replace the scope 101 as in the special light observation mode, it is reasonable to stop the mask determination processing. Note that, in performing the mask determination processing, each of RGB signals included in the image signal output from the camera head 102 may be weighted.

Figure 17:
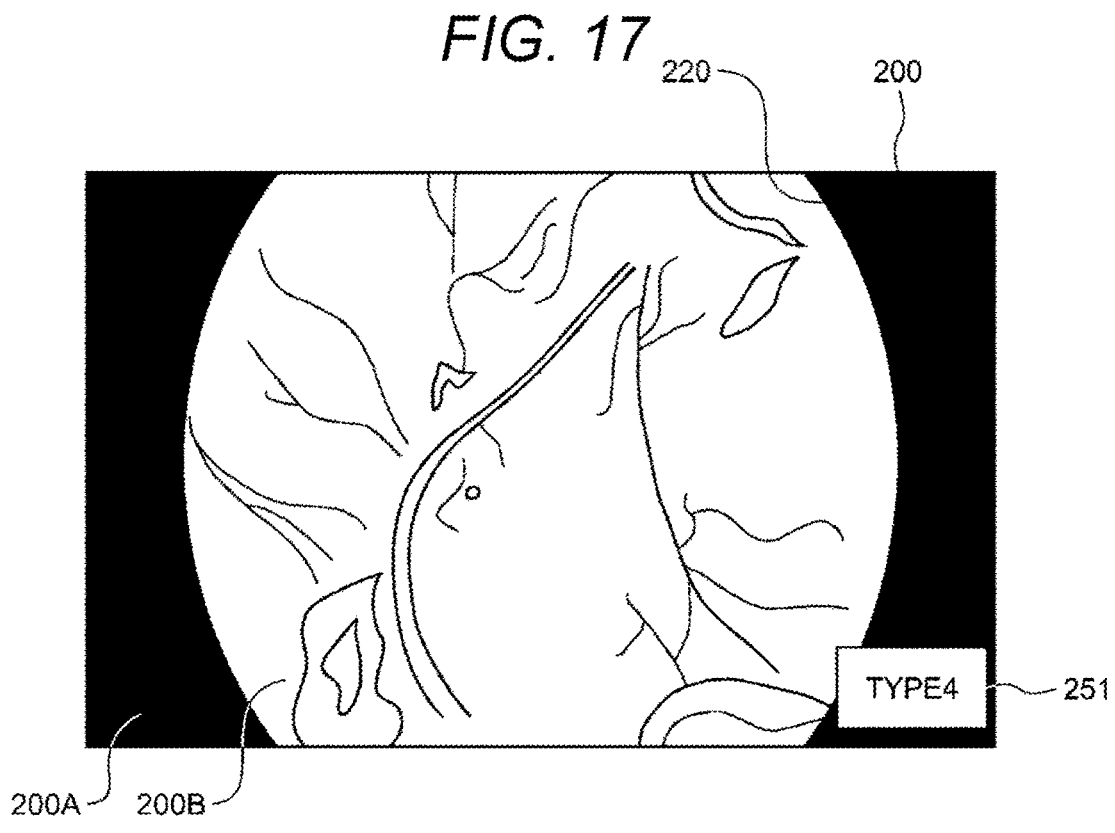
FIG. 17 is a diagram illustrating a display example of mask diameter information.
Figure 18:
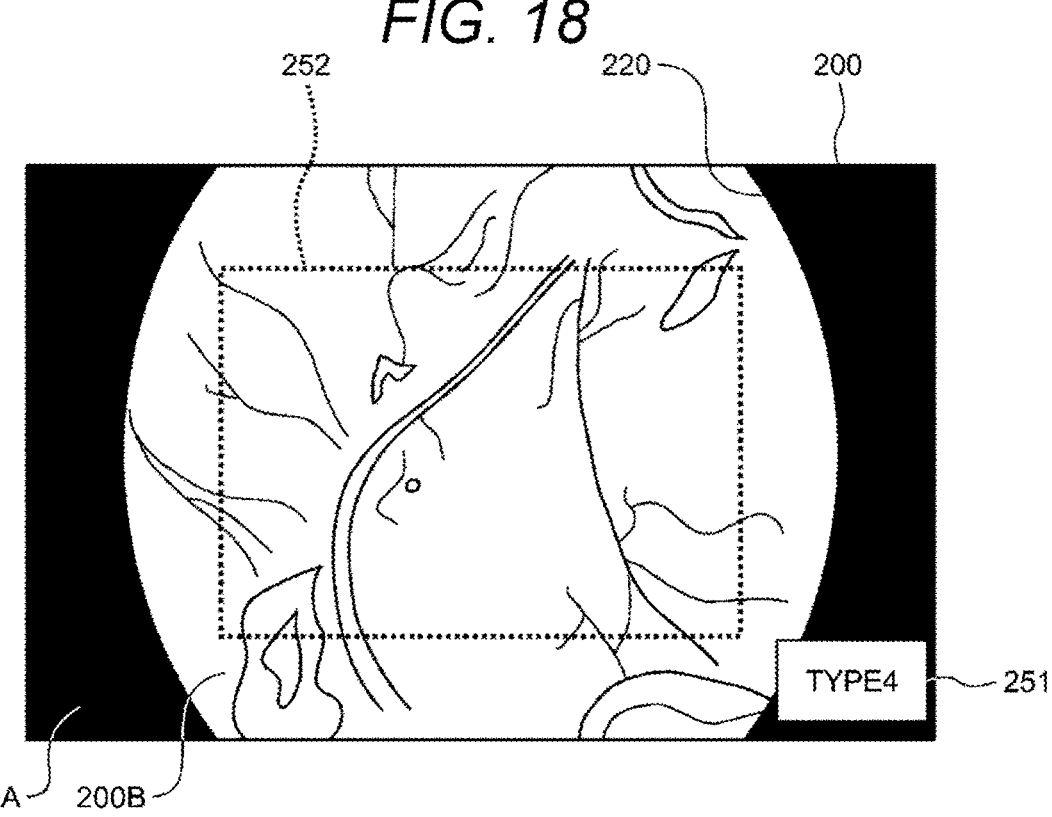
FIG. 18 is a diagram illustrating a display example of a virtual frame.

As illustrated in FIG. 17, an icon 251 corresponding to the scope 101 estimated to be currently connected may be displayed together with the endoscopic image 200. In the example of FIG. 17, since the mask type of "TYPE4" is set as the mask diameter information by the mask determination processing, the icon 251 indicating "TYPE4" is displayed. For example, the icon 251 can be displayed at a predetermined timing such as when the mask determination process is executed or when the mask diameter information to be notified is changed (when the scope 101 is replaced). As illustrated in FIG. 18, a virtual frame 252 indicating an effective area to be subjected to AE or AF may be displayed in the observation area 200B included in the endoscopic image 200.

In a case where it is detected that a high-luminance object such as the forceps 23 or gauze has entered the imaging area of the image sensor 152, the mask determination processing can be stopped. An area such as the forceps 23 or gauze may be specified in the endoscopic image 200, and the area may be excluded from the target area. In the detection of the forceps 23, gauze, or the like, it may be determined that the forceps 23, gauze, or the like is present in a case where the determination result of the mask determination process greatly fluctuates, the fluctuation occurs many times in a short period, or the like. Alternatively, in a case where it is determined that the mask diameter information has changed without passing through a state where the scope 101 is detached, it may be determined that the forceps 23, gauze, or the like is present.

Furthermore, in the case of gauze, it is assumed that so-called blown-out highlights continue to occur when images are closely captured. As a method of coping with such an event, for example, monitoring is performed in time series, so that an evaluation value of an area determined to be the vignetting area 200A may be measured in advance, and when a variation is detected in an outer area during the mask determination processing, a threshold (for example, a threshold of a time interval or the number of consecutive times) used in the mask determination processing may be changed.

Note that embodiments of the present disclosure are not limited to the embodiments described above, and various modifications may be made without departing from the scope of the present disclosure. Furthermore, the effects described in the present specification are merely examples and are not restrictive, and other effects may be achieved.

Furthermore, each step described in the flowcharts described above may be executed by one device, or can be performed by a plurality of devices in a shared manner. Moreover, in a case where a plurality of processes is included in one Step, the plurality of the processes included in the one Step can be executed by one device or shared and executed by the plurality of the devices.

In the present specification, a system is intended to mean a set of a plurality of components (devices, modules (parts), or the like), and it does not matter whether or not all the components are disposed in the same housing. Therefore, a plurality of devices housed in separate housings and connected through a network, and a single device with a plurality of modules disposed in one housing are both systems.

Furthermore, the present disclosure can have the following configurations.

(1)

An endoscope system including:

an imaging device to which an insertion unit is connected, the imaging device receiving light guided through the insertion unit by an image sensor to capture an image; and a control device that controls the imaging device, in which the control device includes one or more processors and one or more storage devices storing a program, and the processor executes the program to:

determine a size of an observation area different from a vignetting area generated on the image sensor by the insertion unit at least twice or more; and perform parameter change processing based on a determination result on the basis of a comparison result of comparison of two or more determination results.

(2)

The endoscope system according to the above (1), in which the processor repeatedly determines the size of the observation area at a predetermined time interval, and performs the parameter change processing in a case where the determination results are the same for a predetermined number of consecutive times.

(3)

The endoscope system according to the above (2), in which the processor

25 uses a parameter based on the determination result obtained in current determination in a case where the determination results are the same for a predetermined number of consecutive times, and uses a parameter based on the determination result obtained in last determination in a case where the determination results are not the same for a predetermined number of consecutive times.

(4)

The endoscope system according to any one of the above (1) to (3), in which the parameter change processing includes processing of changing an area of an evaluation frame of auto exposure (AE) or auto focus (AF).

(5)

The endoscope system according to the above (2) or (3), in which the processor compares the number of consecutive determination results with a threshold determined in advance according to a disturbance to determine whether or not the determination results are the same for a predetermined number of consecutive times.

(6)

The endoscope system according to the above (5), in which the processor changes the threshold according to a surgical mode or an observation mode.

(7)

The endoscope system according to the above (2) or (3), in which the processor repeatedly determines the size of the observation area at predetermined time intervals during operation in a normal light observation mode or a special light observation mode.

(8)

The endoscope system according to the above (7), in which when switching from the normal light observation mode to the special light observation mode, the processor uses a parameter based on a determination result obtained during operation in the normal light observation mode.

(9)

The endoscope system according to any one of the above (1) to (8), in which the processor controls display of information regarding a size of the insertion unit corresponding to the size of the observation area together with an endoscopic image based on an image signal output from the imaging device.

(10)

The endoscope system according to the above (9), in which the processor controls display of a virtual frame indicating an effective area to be subjected to AE or AF with respect to the observation area included in the endoscopic image.

(11)

A control method including:

by a control device that controls an imaging device to which an insertion unit is connected and which receives light guided through the insertion unit by an image sensor and captures an image, determining a size of an observation area different from a vignetting area generated on the image sensor by the insertion unit at least twice or more; and

26 performing parameter change processing based on a determination result on the basis of a comparison result of comparison of two or more determination results.

(12)

A program for causing a computer to function as a control device, the control device determining, at least twice or more, a size of an observation area different from a vignetting area generated on an image sensor by an insertion unit connected to an imaging device that receives light guided through the insertion unit by an image sensor and captures an image, and performing parameter change processing based on a determination result on the basis of a comparison result of comparison of two or more determination results.

REFERENCE SIGNS LIST

1 Endoscopic surgery system
10 Endoscope
20 Surgical instrument
30 Support arm device
51 Control device
52 Display device
53 Light source device
54 Input device
55 Treatment tool control device
56 Insufflation device
57 Recorder
58 Printer
101 Scope
102 Camera head
151 Lens unit
152 Image sensor
153 Drive circuit
154 Communication circuit
155 Camera head control circuit
161, 161-1 to 161-$i$ Processor
162, 162-1 to 162-$j$ Storage device
163 Communication circuit
171 Control program
181 Evaluation frame setting unit
182 Evaluation value calculation unit
183 Evaluation value determination unit
184 Determination result setting unit
185 Determination result determination unit
186 Notification target setting unit

The invention claimed is:

1. An endoscope system comprising:

an imaging device to which a scope is connected, the imaging device receiving light guided through the scope by an image sensor to capture an image; and a control device that controls the imaging device, wherein the control device includes one or more processors and one or more storage devices storing a program, and the processor executes the program to:

determine a size of an observation area different from a vignetting area generated on the image sensor by the scope at least twice or more to generate two or more consecutive determination results;

compare two or more consecutive determination results; and in response to the two or more consecutive determination results being the same, perform parameter change processing based on the same consecutive determination results, and in response to the two or more consecutive determination results not being the same, maintain a parameter from a previous determination.

2. The endoscope system according to claim 1, wherein the processor repeatedly determines the size of the observation area at a predetermined time interval, and performs the parameter change processing in a case where the determination results are the same for a predetermined number of consecutive times.

3. The endoscope system according to claim 2, wherein the processor uses a parameter based on the determination result obtained in current determination in a case where the determination results are the same for a predetermined number of consecutive times, and uses a parameter based on the determination result obtained in last determination in a case where the determination results are not the same for a predetermined number of consecutive times.

4. The endoscope system according to claim 2, wherein the processor compares the number of consecutive determination results with a threshold determined in advance according to a disturbance to determine whether or not the determination results are the same for a predetermined number of consecutive times.

5. The endoscope system according to claim 4, wherein the processor changes the threshold according to a surgical mode or an observation mode.

6. The endoscope system according to claim 2, wherein the processor repeatedly determines the size of the observation area at predetermined time intervals during operation in a normal light observation mode or a special light observation mode.

7. The endoscope system according to claim 6, wherein when switching from the normal light observation mode to the special light observation mode, the processor uses a parameter based on a determination result obtained during operation in the normal light observation mode.

8. The endoscope system of claim 2, wherein the predetermined time interval corresponds to a predetermined number of captured image frames.

9. The endoscope system according to claim 1, wherein the parameter change processing includes processing of changing an area of an evaluation frame of auto exposure (AE) or auto focus (AF).

10. The endoscope system according to claim 1, wherein the processor controls display of information regarding a size of the scope corresponding to the size of the observation area together with an endoscopic image based on an image signal output from the imaging device.

11. The endoscope system according to claim 10, wherein the processor controls display of a virtual frame indicating an effective area to be subjected to AE or AF with respect to the observation area included in the endoscopic image.

12. The endoscope system of claim 1, wherein the determination of the size of the observation area is performed by setting a plurality of evaluation frames in a captured image and calculating luminance values within the plurality of evaluation frames.

13. The endoscope system of claim 1, wherein the determination of the size of the observation area is temporarily stopped when a high-luminance object is detected within the observation area.

14. The endoscope system of claim 13, wherein the determination of the size of the observation area is stopped when switching from the normal light observation mode to a special light observation mode.

15. A control method comprising:
by a control device that controls an imaging device to which a scope is connected and which receives light guided through the scope by an image sensor and captures an image,
determining a size of an observation area different from a vignetting area generated on the image sensor by the scope at least twice or more to generate two or more consecutive determination results:
comparing the two or more consecutive determination results; and
in response to the two or more consecutive determination results being the same, performing parameter change processing based on the same consecutive determination results, and
in response to the two or more consecutive determination results not being the same, maintaining a parameter previously used.

16. The control method according to claim 15, further comprising repeatedly determining the size of the observation area at a predetermined time interval, and performing the parameter change processing in a case where the determination results are the same for a predetermined number of consecutive times.

17. The control method according to claim 15, further comprising comparing the number of consecutive determination results with a threshold determined in advance according to a disturbance to determine whether or not the determination results are the same for a predetermined number of consecutive times.

18. A non-transitory computer-readable medium storing a program for causing a computer to function as a control device, the control device:
determining, at least twice or more, a size of an observation area different from a vignetting area generated on an image sensor by a scope connected to an imaging device that receives light guided through the scope by an image sensor and captures an image to generate two or more consecutive determination results,
comparing the two or more consecutive determination results, and
in response to the two or more consecutive determination results being the same, performing parameter change processing based on the same consecutive determination results, and
in response to the two or more consecutive determination results not being the same, maintaining a parameter previously used.

19. The non-transitory computer-readable medium according to claim 18, wherein the program further causes the computer to function as the control device to repeatedly determine the size of the observation area at a predetermined time interval, and performing the parameter change processing in a case where the determination results are the same for a predetermined number of consecutive times.

20. The non-transitory computer-readable medium according to claim 19, wherein the program further causes the computer to function as the control device comparing the number of consecutive determination results with a threshold determined in advance according to a disturbance to determine whether or not the determination results are the same for a predetermined number of consecutive times.

* * * * *